(12) United States Patent
Tanaka et al.

(10) Patent No.: US 8,523,990 B2
(45) Date of Patent: Sep. 3, 2013

(54) INK COMPOSITION, INKJET RECORDING INK COMPOSITION, INK SET, INK CARTRIDGE, INKJET RECORDING METHOD AND RECORDED MATTER

(75) Inventors: Shigeaki Tanaka, Shizouka (JP); Keiichi Tateishi, Shizouka (JP); Takashi Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 278 days.

(21) Appl. No.: 12/999,233

(22) PCT Filed: Jun. 15, 2009

(86) PCT No.: PCT/JP2009/060902
§ 371 (c)(1),
(2), (4) Date: Dec. 15, 2010

(87) PCT Pub. No.: WO2009/154185
PCT Pub. Date: Dec. 23, 2009

(65) Prior Publication Data
US 2011/0104458 A1    May 5, 2011

(30) Foreign Application Priority Data

Jun. 16, 2008    (JP) ................... 2008-157030

(51) Int. Cl.
C09D 11/02    (2006.01)

(52) U.S. Cl.
USPC ............ 106/31.48; 106/31.5; 106/31.58

(58) Field of Classification Search
USPC ............ 106/31.48, 31.5, 31.58; 347/100; 427/256; 428/195.1
See application file for complete search history.

(56) References Cited

U.S. PATENT DOCUMENTS

| | | | | |
|---|---|---|---|---|
| 5,370,731 A * | 12/1994 | Yamashita et al. | ......... | 106/31.43 |
| 6,991,676 B2 * | 1/2006 | Kabalnov et al. | ......... | 106/31.48 |
| 7,465,347 B2 * | 12/2008 | Kitamura et al. | ......... | 106/31.48 |
| 7,776,144 B2 * | 8/2010 | Taguchi et al. | ......... | 106/31.48 |
| 8,101,011 B2 * | 1/2012 | Tateishi et al. | ......... | 106/31.48 |
| 8,257,479 B2 * | 9/2012 | Goto et al. | ......... | 106/31.48 |
| 2008/0145561 A1 * | 6/2008 | Kitamura et al. | ......... | 106/31.48 |
| 2008/0274283 A1 * | 11/2008 | Tateishi et al. | ......... | 427/256 |
| 2010/0302305 A1 * | 12/2010 | Tateishi et al. | ......... | 106/31.5 |
| 2011/0091696 A1 * | 4/2011 | Tanaka et al. | ......... | 428/195.1 |
| 2011/0104458 A1 * | 5/2011 | Tanaka et al. | ......... | 106/31.48 |

FOREIGN PATENT DOCUMENTS

| | | |
|---|---|---|
| EP | 1 619 224 A1 | 1/2006 |
| JP | 6-136309 A | 5/1994 |
| JP | 6-234943 A | 8/1994 |
| JP | 6-240189 A | 8/1994 |
| JP | 2001-271013 A | 10/2001 |
| JP | 2002-540281 A | 11/2002 |
| JP | 2006-169320 A | 6/2006 |
| JP | 2006-199922 A | 8/2006 |
| JP | 2006-528262 A | 12/2006 |
| JP | 2007-063520 A | 3/2007 |
| JP | 2007-070566 A | 3/2007 |
| JP | 2007-091867 A | 4/2007 |
| JP | 2007-191644 A | 8/2007 |
| JP | 2007-302810 A | 11/2007 |
| JP | 2008-031261 A | 2/2008 |
| WO | WO 2006/082669 A1 * | 8/2006 |
| WO | 2008013221 A1 | 1/2008 |
| WO | 2009154184 A1 | 12/2009 |

OTHER PUBLICATIONS

Machine translation of JP 2007/091867, Apr. 2007.*
European Search Report issued May 22, 2012 in corresponding European Application No. 09766633.
International Search Report [PCT/ISA/210] issued Jul. 14, 2009, for PCT/JP2009/060902.
Written Opinion [PCT/ISA/237] issued Jul. 14, 2009, for PCT/JP2009/060902.
Office Action dated Jan. 29, 2013 in Chinese Patent Application No. 200980122827.7.

* cited by examiner

*Primary Examiner* — Helene Klemanski
(74) *Attorney, Agent, or Firm* — Sughrue Mion, PLLC

(57) ABSTRACT

An ink composition having a suitably-adjusted hue and causing no decomposition of dyes during storage is provided. The ink composition contains a compound (a) represented by the following formula (1), an ingredient (c) and moisture-retentive agents, characterized by being from 0.1 mass % to lower than 7.0 mass % in content of the compound represented by the formula (1), 10.0 mass % or lower in content of a moisture-retentive agent having 3 or more hydroxyl groups (b) and lower than 30.0 in molar ratio of the moisture-retentive agent having 3 or more hydroxyl groups to the compound represented by the formula (1):

Formula (1)

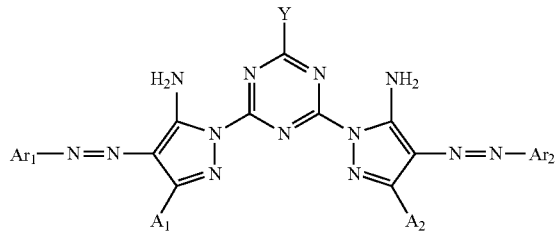

wherein each of $Ar_1$ and $Ar_2$ preferably represents an aromatic heterocyclic group, each of $A_1$ and $A_2$ represents a hydrogen atom or a substituent, Y represents —OM or —$NR_1R_2$, M represents a hydrogen atom or a metal ion and each of $R_1$ and $R_2$ represents a hydrogen atom, an alkyl group, an aryl group, a heterocyclic group or the like. The ingredient (c) is at least one compound selected from C.I. Direct Yellow 59, id. 86, id. 132 or the like.

20 Claims, No Drawings

INK COMPOSITION, INKJET RECORDING INK COMPOSITION, INK SET, INK CARTRIDGE, INKJET RECORDING METHOD AND RECORDED MATTER

TECHNICAL FIELD

The present invention relates to an ink composition containing a compound represented by a formula (1) which is stable for a long time without decomposing during storage and providing printed images which excel in both light fastness and ozone resistance, and further to an inkjet recording ink composition, an ink set, an ink cartridge, an inkjet recording method and recorded matter each of which such an ink composition is used for.

BACKGROUND ART

In recent years, materials for forming color images in particular have been mainstream image-recording materials, and more specifically, inkjet system of recording materials, thermal transfer system of recording materials, electro photographic recording materials, transfer system of silver halide photosensitive materials, printing ink, recording pens and the like have been active in use.

Colorants used in ink compositions are required to have good solubility or dispersability in solvents, to ensure high-density recording, to have good hues, to provide printed images of good storage stability, to excel in fastness to water and chemical agents, to have no toxicity, to be high in purity, and further to be available at low cost.

Recent technological advances have allowed improvements of monochromatic image's fastness to light, heat and active gases in surroundings (e.g. SOx in addition to oxidizing gases such as NOx and ozone) through the enhancement of electric potential of colorant molecules (JP-A-2007-63520). On the other hand, performance requirements for ink compositions include e.g. not only prevention of colorant precipitation from ink compositions, freeze of ink compositions (JP-A-2001-271013), curling at the time of printing of ink compositions on substrates (JP-A-6-240189) and decomposition of ink compositions (JP-A-6-234943), but also protection of colorants in the ink compositions from smearing at the time of printing (JP-A-6-136309), and these challenges have been solved by use of various additives in ink compositions.

Tries to improve properties of colorants and storage stability of ink compositions through the use of additives have been made as described in JP-A-2007-70566, and improvements in stabilization of dissolved colorants have been obtained.

On the other hand, techniques to use a variety of color materials in combination are described in JP-A-2007-191644, JP-A-2007-302810 and JP-A-2008-31261, but these techniques cannot satisfy even the long-term storage stability of ink compositions.

SUMMARY OF INVENTION

A problem to be solved by the invention is providing a yellow ink composition which has a suitably-adjusted hue at the time of use, undergoes no change in hue during the storage thereof, causes neither decomposition nor precipitation of a colorant incorporated therein even when stored in such a high-temperature setting as to occur in a car in a summer season, and besides, which gives yellow images excelling in fastness to light and ozone gas. Another problem is providing an ink composition which has good discharge performance when it is discharged from a printer head in forming images by means of an inkjet printer.

The high-potential colorants having improved fastness, though ensure for monochromatic images excellent fastness to light, heat and active gases in the surroundings (e.g. SOx in addition to oxidizing gases such as NOx and ozone), are susceptible to attack by nucleophilic species rich in electrons, and their decomposition is therefore promoted by additives incorporated in ink compositions to cause color fading or discoloration. This phenomenon has presented a new problem. From our findings, it is inferred that a method for retaining storage stability of ink compositions for a long time consists in lowering electric potential of colorant molecules or enhancing associational ability by promoting interactions among colorant molecules or mixing compounds capable of heightening solution stability in ink compositions. However, the method of lowering electric potential of colorant molecules impairs the worth of ink compositions as commodities because it causes deterioration in fastness of colorants to light and ozone gas. And the method of enhancing associational ability of a colorant requires time and efforts because execution thereof must be started with molecular design of the colorant.

Hence the Inventors have analyzed how high-potential colorants excelling in fastness to light, heat and active gases in the surroundings were decomposed in ink compositions containing them, and have found that compounds having hydroxyl groups in particular (notably moisture-retentive agents) were relevant to decomposition of the high-potential colorants during long-term storage of the ink compositions. Of such compounds, those having 3 or more hydroxyl groups per molecule have turned out to be highly relevant to conspicuous decomposition of the high-potential colorants when they were present in specified amounts or more in ink compositions, and also when the high-potential colorant concentrations of ink compositions were small. Thus it has been inferred that these findings would be ascribable to a phenomenon in which compounds having 3 or more hydroxyl groups per molecule underwent multiple interaction specifically with high-potential colorants. In this phenomenon, it is inferred that the colorants themselves are activated by electronic effect based on the interaction and thereby hydrolysis is induced. However, the invention is not restricted by such inference. As a result of our intensive study of methods for controlling decomposition of colorants, we have thought that it would be necessary not only to reduce the usage of a compound having 3 or more hydroxyl groups, more specifically a moisture-retentive agent having 3 or more hydroxyl groups, but also to break off the multiple interaction between a colorant and the moisture-retentive agent. In the latter case, it is thought to be important that colorant molecules are positively made to associate with one another and close proximity of these associated colorant molecules to the moisture-retentive agent is inhibited by steric repulsion. We have therefore made intensive study of the types and amounts of moisture-retentive agents used and a search for colorants having appropriate association promoting effect and no adverse effect on performance of an ink composition when they are mixed in the ink composition. As a result thereof, we have found that the challenge required can be resolved by mixing a color material of specific structure with a high-potential colorant and further by choosing the types of and adjusting the amounts of hydroxyl group-containing compounds, notably a moisture-retentive agent, to be added. Further, it has been found that the storage stability of an ink composition is improved by such a method and, even after long-term storage, the ink composition can provide printed images without imposing a discharging load on a printer head and the printed images using this ink composition excel in color reproduction range and fastness to light and ozone gas, thereby achieving the invention.

The challenges to the invention can be resolved by the following embodiments of the invention.

[1] An ink composition containing: a compound represented by the following formula (1); an ingredient (C); and a moisture-retentive agent, wherein a content of compound represented by the formula (1) is from 0.1 mass % to lower than 7.0 mass %, a content of moisture-retentive agent having 3 or more hydroxyl groups is 10.0 mass % or lower, a molar ratio of the moisture-retentive agent having 3 or more hydroxyl groups to the compound represented by the formula (1) is lower than 30.0.

Formula (1)

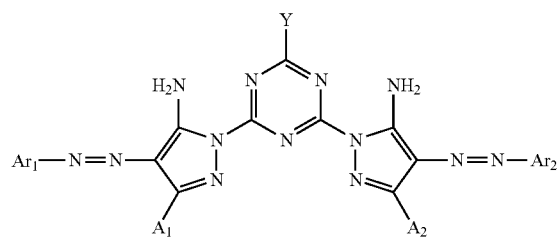

In formula (1), each of $Ar_1$ and $Ar_2$ independently represents an aromatic cyclic hydrocarbyl group, a nonaromatic cyclic hydrocarbyl group, an aromatic heterocyclic group or a nonaromatic heterocyclic group; each of $A_1$ and $A_2$ independently represents a hydrogen atom or a substituent which may further have a substituent; Y represents —OM or —$NR_1R_2$; M represents a hydrogen atom or a metal ion; and each of $R_1$ and $R_2$ independently represents a hydrogen atom, an alkyl group, an alkenyl group, an alkynyl group, an aralkyl group, an aryl group or a heterocyclic group.

The ingredient (C) is at least one compound selected from C.I. Direct Yellow 59, id. 86, id. 132, id, 173, C.I. Acid Yellow 23 and compounds represented by the following formulae (2) to (6). Each M in the formulae (2) to (5) represents a hydrogen atom or a metal ion; R in the formula (2) represents a hydrogen atom or a methyl group; and $M'^-$ in the formula (6) represents a halogen ion, an inorganic anion or an organic anion.

Formula (2)

-continued

Formula (3)

Formula (4)

Formula (5)

Formula (6)

[2] The ink composition according to [1], wherein the content of moisture-retentive agent having 3 or more hydroxyl groups is 8.5 mass % or lower.

[3] The ink composition according to [1] or [2], wherein the molar ratio is lower than 25.0.

[4] The ink composition according to [3], wherein the molar ratio is lower than 15.0.

[5] The ink composition according to [3] or [4], wherein the molar ratio is lower than 10.0.

[6] The ink composition according to any of [1] to [5], wherein the moisture-retentive agents further include a moisture-retentive agent having 0 to 2 hydroxyl groups.

[7] The ink composition according to any of [1] to [6], wherein the content of moisture-retentive agent having 3 or more hydroxyl groups is lower than 25.0 mass % of the content of all moisture-retentive agents.

[8] The ink composition according to any of [1] to [7], wherein the content of moisture-retentive agent having 3 or more hydroxyl groups is lower than 20.0 mass % of the content of all moisture-retentive agents.

[9] The ink composition according to any of [1] to [8], wherein the content of moisture-retentive agent having 3 or more hydroxyl groups is lower than 15.0 mass % of the content of all moisture-retentive agents.

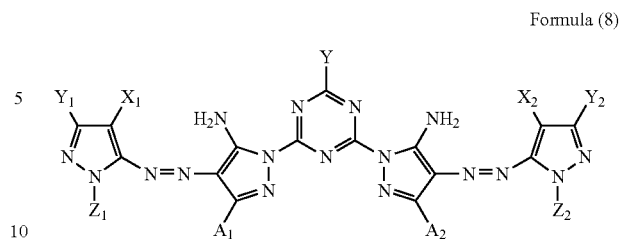

Formula (8)

In formula (8), $A_1$, $A_2$ and Y have the same meanings as $A_1$, $A_2$ and Y in the formula (1), respectively; each of $Y_1$ and $Y_2$ independently represents a hydrogen atom or a substituent; each of $X_1$ and $X_2$ independently represents an electron-withdrawing group having a Hammett's σp value of 0.20 or greater; and each of $Z_1$ and $Z_2$ independently represents a hydrogen atom, an alkyl group, an alkenyl group, an alkynyl group, an aralkyl group, an aryl group or a heterocyclic group.

[12] The ink composition according to [11], wherein the compound represented by the formula (8) is a compound represented by the following formula (9).

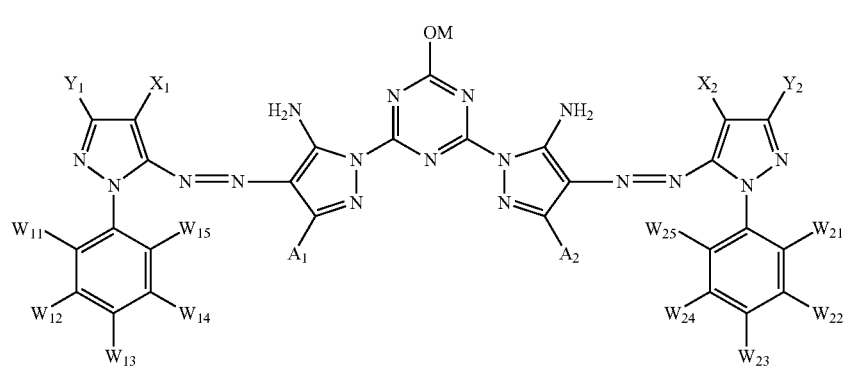

Formula (9)

[10] The ink composition according to any of [1] to [9], wherein the ingredient (C) is at least one compound selected from among the compounds represented by the formulae (2) to (6).

[11] The ink composition according to any of [1] to [10], wherein the compound represented by the formula (1) is a compound represented by the following formula (8).

In formula (9), $A_1$, $A_2$, $X_1$, $X_2$, $Y_1$ and $Y_2$ have the same meanings as $A_1$, $A_2$, $X_1$, $X_2$, $Y_1$ and $Y_2$ in the formula (8), respectively; each of $W_{11}$, $W_{12}$, $W_{13}$, $W_{14}$, $W_{15}$, $W_{21}$, $W_{22}$, $W_{23}$, $W_{24}$ and $W_{25}$ independently represents a hydrogen atom or a substituent; and M represents a hydrogen atom or a metal ion.

[13] The ink composition according to any of [1] to [10], wherein the compound represented by the formula (1) is a compound represented by the following formula (10).

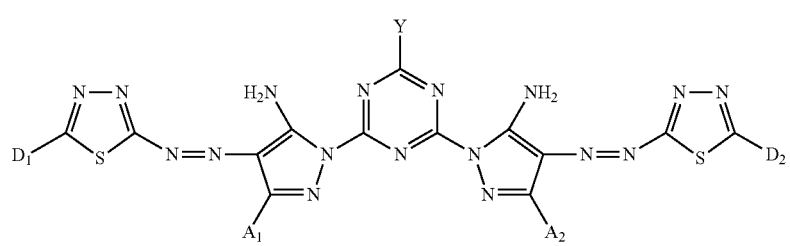

Formula (10)

In formula (10), $A_1$, $A_2$ and Y have the same meanings as $A_1$, $A_2$ and Y in the formula (1), respectively; and each of $D_1$ and $D_2$ independently represents a hydrogen atom or a substituent.

[14] The ink composition according to [13], wherein the compound represented by the formula (10) is a compound represented by the following formula (11).

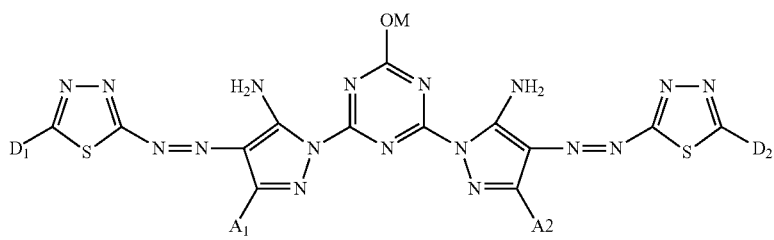

Formula (11)

In formula (11), $A_1$, $A_2$, $D_1$ and $D_2$ have the same meanings as $A_1$, $A_2$, $D_1$ and $D_2$ in the formula (10), respectively; and M represents a hydrogen atom or a metal ion.

[15] The ink composition according to any of [1] to [14], further containing an urea derivative.
[16] An inkjet recording ink composition using the ink composition according to any of [1] to [15].
[17] An ink set used for an inkjet recording method, wherein the ink composition according to any of [1] to [16] is contained as a constituent.
[18] An ink cartridge, wherein the ink composition according to any of [1] to [16] is contained.
[19] An ink cartridge, wherein the ink set according to [17] is independently or integrally accommodated.
[20] An inkjet recording method for recording by discharging droplets of an ink composition and allowing the droplets to adhere to a recording medium, wherein the recording are produced through the use of the ink set according to [17] or the ink cartridge according to either [18] or [19].
[21] A recorded matter, which is made through printing according to the inkjet recording method according to [20].

The invention can provide an ink composition which has an excellent yellow hue and ensures an improvement in colorant decomposition even when it is stored in high-temperature surroundings. In particular, the invention can provide an inkjet recording ink composition which can produce printed images excelling in fastness to light and ozone gas.

DESCRIPTION OF EMBODIMENTS

The following are detailed descriptions of the invention.

The present ink composition is an ink composition containing a compound represented by the following formula (1), an ingredient (C) and moisture-retentive agents, wherein a content of compound represented by the formula (1) is from 0.1 mass % to lower than 7.0 mass %, 10.0 mass % or lower in content of moisture-retentive agent having 3 or more hydroxyl groups and lower than 30.0 in molar ratio of the moisture-retentive agent having 3 or more hydroxyl groups to the compound represented by the formula (1).

<Compounds Represented by Formula (1)>

To begin with, the Hammett substituent constant σp values used in this specification are explained a little.

The Hammett's rule is an empirical rule espoused by L. P. Hammett in 1935 for the purpose of quantitatively discussing effects of substituents on reactions or equilibriums of benzene derivatives, and the validity thereof is universally recognized nowadays. The substituent constants required of the Hammett's rule are σp and σm values. These values can be found in a great number of general books, and detailed e.g. in J. A. Dean, *Lange's Handbook of Chemistry*, 12th edition, 1979 (McGraw-Hill), and Kagaku no Ryoiki, extra number, vol. 122, pp. 96-103, 1979 (Nankodo Co., Ltd.). Although various substituents usable in the invention are defined and explained by their Hammett substituent constant σp values, it is needless to say that they should not be construed as being limited to substituents whose σp values are known in literature and can be found in the books cited above, but include substituents whose σp values, though unknown, will fall within a range specified by the invention when determined by the Hammett's rule. The compounds represented by the formulae (1) and (8) to (11) according to the invention are not benzene derivatives, but as a yardstick for measuring electronic effects of their substituents, σp values are used irrespective of substitution sites. In the invention, σp values are used in such a sense hereafter.

Compounds represented by the formula (1) in the invention are illustrated below.

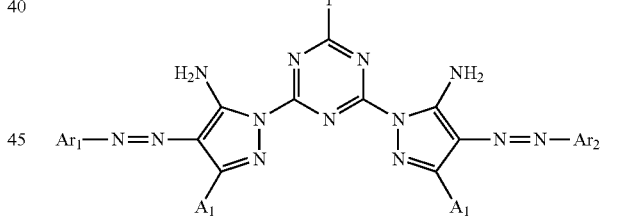

Formula (1)

Each of $Ar_1$ and $Ar_2$ independently represents an aromatic cyclic hydrocarbyl group, a nonaromatic cyclic hydrocarbyl group, an aromatic heterocyclic group or a nonaromatic heterocyclic group.

Each of $A_1$ and $A_2$ independently represents a hydrogen atom or a substituent, and this substituent may further have a substituent.

Y represents —OM or —$NR_1R_2$, M represents a hydrogen atom or a metal ion, and each of $R_1$ and $R_2$ independently represents a hydrogen atom, an alkyl group, an alkenyl group, an alkynyl group, an aralkyl group, an aryl group or a heterocyclic group.

Further detailed explanations of the formula (1) are given below.

Each of $Ar_1$ and $Ar_2$ represents an aromatic cyclic hydrocarbyl group, a nonaromatic cyclic hydrocarbyl group, an aromatic heterocyclic group or a nonaromatic heterocyclic group, and these groups may be monocyclic groups or other rings may further be fused with these groups. Each of the rings may further have a substituent, and examples of such substituent include substituents (SUB) as recited hereinafter. Examples of the aromatic cyclic hydrocarbyl group include aryl groups recited hereafter as members of the substituents (SUB). Examples of the nonaromatic cyclic hydrocarbyl group include cycloalkyl groups and bicycloalkyl groups recited hereafter as members of the substituents (SUB). Examples of the nonaromatic heterocyclic group include a piperidyl group, a piperidino group, a morpholinyl group and a morpholino group.

$Ar_1$ and $Ar_2$ are preferably aromatic heterocyclic groups, far preferably nitrogen-containing 5- to 7-membered aromatic heterocyclic groups. Of these heterocyclic rings, 5- and 6-membered aromatic heterocyclic rings are preferred. Although preferred examples, far preferred examples and further preferred examples of $Ar_1$ and $Ar_2$ are recited below, no particular restrictions are imposed on substitution sites at which $Ar_1$ and $Ar_2$ are attached to the azo groups, respectively, substituents which $Ar_1$ and $Ar_2$ may have and substitution sites thereof Preferred examples of $Ar_1$ and $Ar_2$ include a phenyl group, an imidazolyl group, a benzimidazolyl group, a pyrazolyl group, a benzopyrazolyl group, a triazolyl group, a thiazolyl group, a benzothiazolyl group, an isothiazolyl group, a benzisothiazolyl group, an oxazolyl group, a benzoxazolyl group, a thiadiazolyl group, a pyrrolyl group, a benzopyrrolyl group, an indolyl group, an isoxazolyl group, a benzisoxazolyl group, a thiophenyl group, a benzothiophenyl group, a furanyl group, a benzofuranyl group, a pyridinyl group, a quinolinyl group, an isoquinolinyl group, a pyridazinyl group, a pyrimidinyl group, a pyrazinyl group, a cinnolinyl group, a phthalazinyl group, a quinazolinyl group, a quinoxalinyl group and a triazinyl group.

Each of $Ar_1$ and $Ar_2$ is far preferably a pyridinyl group, a pyrimidinyl group, a pyridazinyl group, a pyrrolyl group, an imidazolyl group, a pyrazolinyl group, a triazolyl group, an oxazolyl group, an isoxazolyl group, a thiazolyl group, an isothiazolyl group or a thiadiazolyl group, and further preferred examples thereof include a pyrazolyl group, a thiazolyl group, an isothiazolyl group and a thiadiazolyl group. Of these groups, a pyrazolyl group or a thiadiazolyl group in particular is preferred.

These groups may further have substituents.

Examples of substituents which $Ar_1$ and $Ar_2$ may have include a halogen atom, an alkyl group, an alkenyl group, an alkynyl group, an aralkyl group, an aryl group, a heterocyclic group, a cyano group, a hydroxyl group, a nitro group, a carboxyl group, an alkoxy group, an aryloxy group, a silyloxy group, a heterocyclyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, arylthio group, a heterocyclylthio group, a sulfamoyl group, a sulfo group, an alkyl- or arylsulfinyl group, an alkyl- or arylsulfonyl group, an acyl group, an aryloxycarbonyl group, an alkoxycarbonyl group, a carbamoyl group, an aryl- or heterocyclylazo group, an imido group, a phosphino group, a phosphinyl group, a phosphinyloxy group, a phosphinylamino group, a silyl group and ionic hydrophilic groups. Among these substituents, preferred ones are a halogen atom, an alkyl group, an aryl group, a heterocyclic group, a cyano group, an amino group, an acylamino group and an alkyl- or arylsulfonyl group, and far preferred ones are an alkyl group, an aryl group, a cyano group, —$SO_2CH_3$ and —$SO_2Ph$.

The group suitable as $Ar_1$ and $Ar_2$ each is a prazolyl group, the substituent thereof is an alkyl group, an aryl group, a cyano group, —$SO_2CH_3$ or —$SO_2Ph$, and it is most suitable that the substituent of the pyrazolyl group is an aryl group or a cyano group. Alternatively, the group suitable as $Ar_1$ and $Ar_2$ each is a thiadiazolyl group, and the substituent thereof is a group selected from an alkyl group, a phenyl group, an alkoxy group, a thioalkoxy group, a phenoxy group, an alkylthio group, an arylthio group, an alkylamino group or an arylamino group. The group selected is preferably an alkyl group, a phenyl group, an alkylthio group, an arylthio group, an alkylamino group or an arylamino group, far preferably an alkyl group or an aryl group.

Herein a detailed explanation of the substituents (SUB) which the groups $Ar_1$ and $Ar_2$ can have is given.

Examples of the halogen atom include a fluorine atom, a chlorine atom, a bromine atom and an iodine atom.

Examples of the alkyl group include straight-chain, branched and cyclic substituted or unsubstituted alkyl groups. In the cyclic ones are included not only a cycloalkyl group and a bicycloalkyl group, but also cycloalkyl groups of structure greater in number of rings, such as a tricyclo structure. Alkyl moieties in substituents explained below (such as alkyl moieties in alkoxy and alkylthio groups) represent alkyl groups having the foregoing conception. In detail, the alkyl group is preferably an alkyl group which contains 1 to 30 carbon atoms, preferably 1 to 20 carbon atoms, in a substituent-removed state. And a substituted or unsubstituted alkyl group containing 1 to 15 carbon atoms is preferred as the alkyl group. Examples of such an alkyl group include a methyl group, an ethyl group, an n-propyl group, an isopropyl group, a t-butyl group, an n-octyl group, an eicosyl group, a 2-chloroethyl group, a 2-cyanoethyl group and a 2-ethylhexyl group. The cycloalkyl group is preferably a substituted or unsubstituted cycloalkyl group which contains 3 to 30 carbon atoms, preferably a cycloalkyl group which contains 3 to 20 carbon atoms, far preferably a cycloalkyl group which contains 3 to 15 carbon atoms, in a substituent-removed state. Suitable examples of such a cycloalkyl group include a cyclohexyl group, a cyclopentyl group and a 4-n-dodecylcyclohexyl group. The bicycloalkyl group is preferably a substituted or unsubstituted bicycloalkyl group which contains 5 to 30 carbon atoms, preferably a bicycloalkyl group which contains 5 to 20 carbon atoms, far preferably a bicycloalkyl group which contains 5 to 15 carbon atoms, in a substituent-removed state. More specifically, the bicycloalkyl group is a univalent group formed by removing one hydrogen atom from a bicycloalkane containing 5 to 30 carbon atoms, such as a bicyclo[1,2,2]heptane-2-yl group or a bicyclo[2.2.2]octane-3-yl group. Examples of a substituent the bicycloalkyl group can have include a hydroxyl group, an alkoxy group, a cyano group, a halogen atom and ionic hydrophilic groups.

However, alkyl groups having aryl groups as substituents (namely aralkyl groups) are not included herein.

Examples of the alkenyl group include straight-chain, branched and cyclic substituted or unsubstituted alkenyl groups, and the cyclic alkenyl groups include cycloalkenyl groups and bicycloalkenyl groups. More specifically, the alkenyl group is a substituted or unsubstituted alkenyl group which contains preferably 2 to 30 carbon atoms, far preferably 2 to 20 carbon atoms, further preferably 2 to 15 carbon atoms, in a substituent-removed state, with examples including a vinyl group, an allyl group, a pulenyl group, geranyl group and an oleyl group, and the cycloalkenyl group is a substituted or unsubstituted cycloalkenyl group which contains preferably 3 to 30 carbon atoms, far preferably 3 to 20 carbon atoms, further preferably 3 to 15 carbon atoms, in a substituent-removed state. More specifically, the cycloalkenyl group is a univalent group formed by removing one hydrogen atom from a cycloalkene containing 3 to 30 carbon atoms, such as a 2-cyclopentene-1-yl group or a 2-cyclohexene-1-yl group. The bicycloalkenyl group is a substituted or unsubstituted bicycloalkenyl group which contains preferably 5 to 30 carbon atoms, far preferably 5 to 20 carbon atoms, further preferably 5 to 15 carbon atoms, in a substituent-removed state. More specifically, the bicycloalkenyl group is a univalent group formed by removing one hydrogen atom from a bicycloalkene having one double bond, such as a bicyclo[2,2,1]hepto-2-ene-1-yl group or a bicyclo[2,2,2]octo-2-ene-4-yl group. Examples of a substituent in the alkenyl group include a hydroxyl group, an alkoxy group, a cyano group, a halogen atom and ionic hydrophilic groups.

The alkynyl group is a substituted or unsubstituted alkynyl group which contains preferably 2 to 30 carbon atoms, far preferably 2 to 20 carbon atoms, further preferably 2 to 15 carbon atoms, in a substituent-removed state, with examples including an ethynyl group, a propargyl group and a trimethylsilylethynyl group. Examples of a substituent which the alknyl group may have include a hydroxyl group, an alkoxy group, a cyano group, a halogen atom and ionic hydrophilic groups.

In the aralkyl group are included an aralkyl group having a substituent and an unsubstituted aralkyl group. The aralkyl group is a substituted or unsubstituted aralkyl group which contains preferably 7 to 30 carbon atoms, far preferably 7 to 20 carbon atoms, further preferably 7 to 15 carbon atoms. Examples of such an aralkyl group include a benzyl group and a 2-phenethyl group. Examples of the substituent include a hydroxyl group, an alkoxy group, a cyano group, a halogen atom and ionic hydrophilic groups.

The aryl group is a substituted or unsubstituted aryl group which contains preferably 6 to 30 carbon atoms, far preferably 6 to 20 carbon atoms, further preferably 6 to 15 carbon atoms, in a substituent-removed state. Examples of such an aryl group include a phenyl group, a p-tolyl group, a naphthyl group, an m-chlorophenyl group and an o-hexadecanoylaminophenyl group. Examples of a substituent the aryl group may have include an alkyl group, an aryl group, a hydroxyl group, an alkoxy group, a cyano group, a halogen atom and ionic hydrophilic groups.

The heterocyclic group is preferably a univalent group formed by removing one hydrogen atom from a 5- or 6-membered substituted or unsubstituted aromatic or nonaromatic heterocyclic compound, far preferably a 5- or 6-membered aromatic heterocyclic group which contains 2 to 30 carbon atoms, preferably 2 to 20 carbon atoms, far preferably 2 to 15 carbon atoms, in a substituent-removed state. Examples of such a heterocyclic group include a 2-furyl group, a 2-thienyl group, a 2-pyrimidinyl group and a 2-benzothiazolyl group. Examples of a substituent which the heterocyclic group may have include an alkyl group, an aryl group, a hydroxyl group, an alkoxy group, a cyano group, a halogen atom and ionic hydrophilic groups.

The alkoxy group represents a substituted or unsubstituted alkoxy group which contains preferably 1 to 30 carbon atoms, far preferably 1 to 20 carbon atoms, further preferably 1 to 15 carbon atoms, in a substituent-removed state, with examples include a methoxy group, an ethoxy group, an isopropoxy group, a t-butoxy group, an n-octyloxy group and a 2-methoxyethoxy group. Examples of a substituent which the alkoxy group may have include an aryl group, a hydroxyl group, an alkoxy group, a cyano group, a halogen atom and ionic hydrophilic groups.

The aryloxy group represents a substituted or unsubstituted aryloxy group which contains preferably 6 to 30 carbon atoms, far preferably 6 to 20 carbon atoms, further preferably 6 to 15 carbon atoms, in a substituent-removed state, with examples including a phenoxy group, a 2-methylphenoxy group, a 4-t-butylphenoxy group, a 3-nitrophenoxy group and a 2-tetradecanoylaminophenoxy group. Examples of a substituent the aryloxy group may have include an alkyl group, an aryl group, a hydroxyl group, an alkoxy group, a cyano group, a halogen atom and ionic hydrophilic groups.

The silyloxy group represents a substituted or unsubstituted silyloxy group which contains preferably 0 to 20 carbon atoms, far preferably 0 to 15 carbon atoms, in a substituent-removed state, with examples including a trimethylsilyloxy group and a diphenylmethylsilyloxy group. Examples of a substituent which the silyloxy group may have include an alkyl group, an aryl group and a heterocyclic group.

The heterocyclyloxy group represents a substituted or unsubstituted heterocyclyloxy group which contains preferably 2 to 30 carbon atoms, far preferably 2 to 20 carbon atoms, further preferably 2 to 15 carbon atoms, in a substituent-removed state, with examples including a 1-phenyltetrazole-5-oxy group and a 2-tetrahydropyranyloxy group. Examples of a substituent which the heterocyclyloxy group may have include an alkyl group, an aryl group, a hydroxyl group, an alkoxy group, a cyano group, a halogen atom and ionic hydrophilic groups.

The acyloxy group is preferably a formyloxy group, a substituted or unsubstituted alkylcarbonyloxy group which contains 2 to 30 carbon atoms in a substituent-removed state, or a substituted or unsubstituted arylcarbonyloxy group which contains 6 to 30 carbon atoms, preferably 6 to 20 carbon atoms, far preferably 6 to 15 carbon atoms, in a substituent-removed state. Examples of such an acyloxy group include an acetyloxy group, a pivaloyloxy group, a stearoyloxy group, a benzoyloxy group and a p-methoxyphenylcarbonyloxy group. Examples of a substituent which the acyloxy group may have include an alkyl group and an aryl group.

The carbamoyloxy group is a substituted or unsubstituted carbamoyloxy group which contains preferably 1 to 30 carbon atoms, far preferably 1 to 20 carbon atoms, further preferably 1 to 15 carbon atoms, in a substituent-removed state, with examples including an N,N-dimethylcarbamoyloxy group, an N,N-diethylcarbamoyloxy group, morpholinocarbonyloxy group, an N,N-di-n-octylaminocarbonyloxy group and an N-n-octylcarbamoyloxy group. Examples of a substituent which the carbamoyloxy group may have include an alkyl group, an aryl group and a heterocyclic group.

The alkoxycarbonyloxy group is a substituted or unsubstituted alkoxycarbonyloxy group which contains prefrerably 2 to 30 carbon atoms, far preferably 2 to 20 carbon atoms, further preferably 2 to 15 carbon atoms, in a substituent-removed state, with examples including a methoxycarbonyloxy group, an ethoxycarbonyloxy group, a t-butoxycarbonyloxy group and an n-octylcarbonyloxy group. Examples of a substituent which the alkoxycarbonyloxy group may have include a hydroxyl group, an alkoxy group, a cyano group, a halogen atom and ionic hydrophilic groups.

The aryloxycarbonyloxy group is a substituted or unsubstituted aryloxycarbonyloxy group which contains preferably 7 to 30 carbon atoms, far preferably 7 to 20 carbon atoms, further preferably 7 to 15 carbon atoms, in a substituent-removed state, with examples including a phenoxycarbonyloxy group, a p-methoxyphenoxycarbonyloxy group and a p-n-hexadecyloxyphenoxycarbonyloxy group. Examples of a substituent which the aryloxycarbonyloxy group may have include an alkyl group, a hydroxyl group, an alkoxy group, a cyano group, a halogen atom and ionic hydrophilic groups.

In the amino group are included an alkylamino group, an arylamino group and a heterocyclylamino group. The amino group is preferably an amino group, a substituted or unsubstituted alkylamino group which contains 1 to 30 carbon atoms, preferably 1 to 20 carbon atoms, far preferably 1 to 15 carbon atoms, in a substituent-removed state, or a substituted or unsubstituted arylamino group which contains 6 to 30 carbon atoms, preferably 6 to 20 carbon atoms, far preferably 6 to 15 carbon atoms, in a substituent-removed state, with examples including a methylamino group, a dimethylamino group, an anilino group, an N-methyl-anilino group and a diphenylamino group. Examples of a substituent which the amino group may have include an alkyl group, an aryl group, a heterocyclic group, a hydroxyl group, an alkoxy group, a cyano group, a halogen atom and ionic hydrophilic groups.

The acylamino group is preferably a formylamino group, a substituted or unsubstituted alkylcarbonylamino group which contains 1 to 30 carbon atoms, preferably 1 to 20 carbon atoms, far preferably 1 to 15 carbon atoms, in a substituent-removed state, or a substituted or unsubstituted arylcarbonylamino group which contains 6 to 30 carbon atoms, preferably 6 to 20 carbon atoms, far preferably 6 to 15 carbon atoms, in a substituent-removed state, with examples including an acetylamino group, a pivaloylamino group, a lauroylamino group, a benzoylamino group and a 3,4,5-tri-n-octyloxyphenylcarbonylamino group. Examples of a substituent which the acylamino group may have include a hydroxyl group, an alkoxy group, a cyano group, a halogen atom and ionic hydrophilic groups.

The aminocarbonylamino group is a substituted or unsubstituted aminocarbonylamino group which contains preferably 1 to 30 carbon atoms, far preferably 1 to 20 carbon atoms, further preferably 1 to 15 carbon atoms, in a substituent-removed state, with examples including a carbamoylamino group, an N,N-diemethylaminocarbonylamino group, an N,N-diethylaminocarbonylamino group and a morpholinocarbonylamino group. Examples of a substituent which the aminocarbonylamino group may have include an alkyl group, an aryl group and a heterocyclic group.

The alkoxycaronylamino group represents a substituted or unsubstituted alkoxycarbonylamino group which contains preferably 2 to 30 carbon atoms, far preferably 2 to 20 carbon atoms, further preferably 2 to 15 carbon atoms, in a substituent-removed state, with examples including a methoxycarbonylamino group, an ethoxycarbonylamino group, a t-butoxycarbonylamino group, an n-octadecyloxycarbonylamino group and an N-methyl-methoxycarbonylamino group. Examples of a substituent which the alkoxycarbonylamino group may have include a hydroxyl group, an alkoxy group, a cyano group, a halogen atom and ionic hydrophilic groups.

The aryloxycarbonylamino group represents a substituted or unsubstituted aryloxycarbonylamino group which contains preferably 7 to 30 carbon atoms, far preferably 7 to 20 carbon atoms, further preferably 7 to 15 carbon atoms, in a substituent-removed state, with examples including a phenoxycarbonylamino group, a p-chlorophenoxycarbonylamino group and an m-n-octyloxyphenoxycarbonylamino group. Examples of a substituent which the aryloxycarbonylamino group may have include a hydroxyl group, an alkoxy group, a cyano group, a halogen atom and ionic hydrophilic groups.

The sulfamoylamino group is a substituted or unsubstituted sulfamoylamino group which contains preferably 0 to 30 carbon atoms, far preferably 0 to 20 carbon atoms, further preferably 0 to 15 carbon atoms, in a substituent-removed state, with examples including a sulfamoylamino group, an N,N-dimethylaminosulfamoylamino group and an N-n-octylaminosulfonylamino group. Examples of a substituent which the sulfamoylamino group may have include an alkyl group, an aryl group and a heterocyclic group.

The alkyl- or arylsulfonylamino group is a substituted or unsubstituted alkylsulfonylamino group which contains preferably 1 to 30 carbon atoms, far preferably 1 to 20 carbon atoms, further preferably 1 to 15 carbon atoms, in a substituent-removed state, or a substituted or unsubstituted arylsulfonylamino group which has preferably 6 to 30 carbon atoms, far preferably 6 to 20 carbon atoms, further preferably 6 to 15 carbon atoms, in a substituent-removed state. Examples thereof include a methylsulfonylamino group, a butylsulfonylamino group, a phenylsulfonylamino group, a 2,3,5-trichlorophenylsulfonylamino group and p-methylphenylsulfonylamino group. Examples of a substituent which the alkyl- or arylsulfonylamino group may have include a hydroxyl group, an alkoxy group, a cyano group, a halogen atom and ionic hydrophilic groups.

The alkylthio group is a substituted or unsubstituted alkylthio group which contains preferably 1 to 30 carbon atoms, far preferably 1 to 20 carbon atoms, further preferably 1 to 15 carbon atoms, in a substituent-removed state, with examples including a methylthio group, an ethylthio group and an n-hexadecylthio group. Examples of a substituent which the alkylthio group may have include an aryl group, a hydroxyl group, an alkoxy group, a cyano group, a halogen atom and ionic hydrophilic groups.

The arylthio group is a substituted or unsubstituted arylthio group which contains preferably 6 to 30 carbon atoms, far preferably 6 to 20 carbon atoms, further preferably 6 to 15 carbon atoms, in a substituent-removed state, with examples including a phenylthio group, a p-chlorophenylthio group and an m-methoxyphenylthio group. Examples of a substituent which the arylthio group may have include an alkyl group, an aryl group, a hydroxyl group, an alkoxy group, a cyano group, a halogen atom and ionic hydrophilic groups.

The heterocyclylthio group is a substituted or unsubstituted heterocyclylthio group which contains preferably 2 to 30 carbon atoms, far preferably 2 to 20 carbon atoms, further preferably 2 to 15 carbon atoms, in a substituent-removed state, with examples including a 2-benzothiazolylthio group and a 1-phenyltetrazole-5-ylthio group. Examples of a substituent which the heterocyclylthio group may have include an alkyl group, an aryl group, a hydroxyl group, an alkoxy group, a cyano group, a halogen atom and ionic hydrophilic groups.

The sulfamoyl group is a substituted or unsubstituted sulfamoyl group which contains preferably 0 to 30 carbon atoms, far preferably 0 to 20 carbon atoms, further preferably 0 to 15 carbon atoms, in a substituent-removed state, with examples including an N-ethylsulfamoyl group, an N-(3-dodecyloxypropyl)sulfamoyl group, an N,N-dimethylsulfamoyl group, an N-acetylsulfamoyl group, an N-benzoylsulfamoyl group and an N-(N'-phenylcarbamoyl)sulfamoyl group. Examples of a substituent which the sulfamoyl group may have include an alkyl group, an aryl group and a heterocyclic group.

The alkyl- or arylsulfinyl group is a substituted or unsubstituted alkylsulfinyl group which contains preferably 1 to 30 carbon atoms, far preferably 1 to 20 carbon atoms, further preferably 1 to 15 carbon atoms, in a substituent-removed state, or a substituted or unsubstituted arylsulfinyl group which contains preferably 6 to 30 carbon atoms, far preferably 6 to 20 carbon atoms, further preferably 6 to 15 carbon atoms, in a substituent-removed state, with examples including a methylsulfinyl group, an ethylsulfinyl group, a phenylsulfinyl group and a p-methylphenylsulfinyl group. Examples of a substituent which the alkyl- or arylsulfinyl group may have include a hydroxyl group, an alkoxy group, a cyano group, a halogen atom and ionic hydrophilic groups.

The alkyl- or arylsulfonyl group is a substituted or unsubstituted alkylsulfonyl group which contains preferably 1 to 30 carbon atoms, far preferably 1 to 20 carbon atoms, further preferably 1 to 15 carbon atoms, in a substituent-removed state, or a substituted or unsubstituted arylsulfonyl group which contains preferably 6 to 30 carbon atoms, far preferably 6 to 20 carbon atoms, further preferably 6 to 15 carbon atoms, in a substituent-removed state, with examples including a methylsulfonyl group, an ethylsulfonyl group, a phenylsulfonyl group and a p-methylphenylsulfonyl group. Examples of a substituent which the alkyl- or arylsulfonyl group may have include a hydroxyl group, an alkoxy group, a cyano group, a halogen atom and ionic hydrophilic groups.

The acyl group is preferably a formyl group, a substituted or unsubstituted alkylcarbonyl group which contains 2 to 30 carbon atoms, preferably 2 to 20 carbon atoms, far preferably 2 to 15 carbon atoms, in a substituent-removed state, a substituted or unsubstituted arylcarbonyl group which contains 7 to 30 carbon atoms, preferably 7 to 20 carbon atoms, far preferably 7 to 15 carbon atoms, in a substituent-removed state, or a substituted or unsubstituted heterocyclylcarbonyl group, the carbonyl group of which is connected to a carbon atom of the heterocyclic ring, which contains 2 to 30 carbon atoms, preferably 2 to 20 carbon atoms, far preferably 2 to 15 carbon atoms, in a substituent-removed state, with examples including an acetyl group, a pivaloyl group, a 2-chloroacetyl group, a stearoyl group, a benzoyl group, a p-n-octyloxyphenylcarbonyl group, a 2-pyridylcarbonyl group and a 2-furylcarbonyl group. Examples of a substituent which the acyl group may have include alkyl group, an aryl group and a heterocyclic group.

The aryloxycarbonyl group is a substituted or unsubstituted aryloxycarbonyl group which contains preferably 7 to 30 carbon atoms, far preferably 7 to 20 carbon atoms, further preferably 7 to 15 carbon atoms, in a substituent-removed state, with examples including a phenoxycarbonyl group, an o-chlorophenoxycarbonyl group, an m-nitrophenoxycarbonyl group and a p-t-butylphenoxycarbonyl group. Examples of a substituent which the aryloxycarbonyl group may have include a hydroxyl group, an alkoxy group, a cyano group, a halogen atom and ionic hydrophilic groups.

The alkoxycarbonyl group is a substituted or unsubstituted alkoxycarbonyl group which contains preferably 2 to 30 carbon atoms, far preferably 2 to 20 carbon atoms, further preferably 2 to 15 carbon atoms, in a substituent-removed state, with examples including a methoxycarbonyl group, an ethoxycarbonyl group, a t-butoxycarbonyl group and an n-octgadecyloxycarbonyl group. Examples of a substituent which the alkoxycarbonyl group may have include a hydroxyl group, an alkoxy group, a cyano group, a halogen atom and ionic hydrophilic groups.

The carbamoyl group is a substituted or unsubstituted carbamoyl group which contains preferably 1 to 30 carbon atoms, far preferably 1 to 20 carbon atoms, further preferably 1 to 15 carbon atoms, in a substituent-removed state, with examples including a carbamoyl group, an N-methylcarbamoyl group, an N,N-dimethylcarbamoyl group, an N,N-di-n-octylcarbamoyl group and an N-(methylsulfonyl)carbamoyl group. Examples of a substituent which the carbamoyl group may have include an alkyl group, an aryl group and a heterocyclic group.

The aryl- or heterocyclylazo group is a substituted or unsubstituted arylazo group which contains preferably 6 to 30 carbon atoms, far preferably 6 to 20 carbon atoms, further preferably 6 to 15 carbon atoms, in a substituent-removed state, or a substituted or unsubstituted heterocyclylazo group which contains preferably 3 to 30 carbon atoms, far preferably 3 to 20 carbon atoms, further preferably 3 to 15 carbon atoms, in a substituent-removed state, with examples including phenylazo, p-chlorophenylazo and 5-ethylthio-1,3,4-thiadiazole-2-ylazo. Examples of a substituent which the aryl- or heterocyclylazo group may have include a hydroxyl group, an alkoxy group, a cyano group, a halogen atom and inonic hydrophilic groups.

The imido group is a substituted or unsubstituted imido group which contains preferably 0 to 30 carbon atoms, far preferably 0 to 20 carbon atoms, further preferably 0 to 15 carbon atoms, in a substituent-removed state, with examples including an N-succinimido group and an N-phthalimido group. Examples of a substituent which the imido group may have include an alkyl group, an aryl group and a heterocyclic group.

The phosphino group is a substituted or unsubstituted phosphino group which contains preferably 0 to 30 carbon atoms, far preferably 0 to 20 carbon atoms, further preferably 0 to 15 carbon atoms, in a substituent-removed state, with examples including a dimethylphosphino group, a diphenylphosphino group and a methylphenoxyphosphino group.

The phosphinyl group is a substituted or unsubstituted phosphinyl group which contains preferably 0 to 30 carbon atoms, far preferably 0 to 20 carbon atoms, further preferably 0 to 15 carbon atoms, in a substituent-removed state, with examples including a phosphinyl group, a dioctyloxyphosphinyl group and a diethoxyphosphinyl group. Examples of a substituent which the phosphinyl group may have include an alkyl group, an aryl group and a heterocyclic group.

The phosphinyloxy group is a substituted or unsubstituted phosphinyloxy group which contains preferably 0 to 30 carbon atoms, far preferably 0 to 20 carbon atoms, further preferably 0 to 15 carbon atoms, in a substituent-removed state, with examples including a diphenoxyphosphinyloxy group and a dioctyloxyphosphinyloxy group. Examples of a substituent which the phosphinyloxy group may have include an alkyl group, an aryl group and a heterocyclic group.

The phosphinylamino group is a substituted or unsubstituted phosphinylamino group which contains preferably 0 to 30 carbon atoms, far preferably 0 to 20 carbon atoms, further preferably 0 to 15 carbon atoms, in a substituent-removed state, with examples including a dimethoxyphosphinylamino group and a dimethylaminophosphinylamino group. Examples of a substituent which the phosphinylamino group may have include an alkyl group, an aryl group and a heterocyclic group.

The silyl group is a substituted or unsubstituted silyl group which contains preferably 0 to 30 carbon atoms, far preferably 0 to 20 carbon atoms, further preferably 0 to 15 carbon atoms, in a substituent-removed state, with examples including a trimethylsilyl group, a t-butyldimethylsilyl group and a phenyldimethylsilyl group. Examples of a substituent which the silyl group may have include an alkyl group, an aryl group and a heterocyclic group.

The ionic hydrophilic groups include a sulfo group, a carboxyl group, a phosphono group, a quaternary ammonium group and the like. Of these ionic hydrophilic groups, a carboxyl group and a sulfo group are preferable to the others, and a carboxyl group in particular is prefarable. The carboxyl group and the sulfo group may be in a salt state, and examples of a counter ion which, together with these groups each, forms a salt include alkali metal ions (such as a lithium ion, a sodium ion and a potassium ion) and organic cations (such as a tetramethylguanidium ion). Examples of an ionic hydrophilic group in a salt state include lithium sulfonate, potassium carboxylate and tetramethylammonium chloride.

As to those having hydrogen atoms among the substituents recited above, the hydrogen atoms may be replaced with the substituents as recited above. Examples of such substituents include an alkylcarbonylaminosulfonyl group, an arylcarbonylaminosulfonyl group, an alkylsulfonylaminocarbonyl group and an arylsulfonylaminocarbonyl group. Examples of these groups include a methylsulfonylaminocarbonyl group, a p-methylphenylsulfonylaminocarbonyl group, an acetylaminosulfonyl group and a benzoylaminosulfonyl group.

Each of $A_1$ and $A_2$ independently represents a hydrogen atom or a substituent. To the substituent, any of those recited above as the substituents (SUB) can be applied. Each of $A_1$ and $A_2$ preferably represents a hydrogen atom, a halogen atom, an alkyl group, an alkenyl group, an alkynyl group, an aralkyl group, an aryl group, a heterocyclic group, a cyano group, a hydroxyl group, a nitro group, a carboxyl group, an alkoxy group, an aryloxy group, a silyloxy group, a heterocyclyloxy group, an acyloxy group, a carbamoyloxy group, an alkoxycarbonyloxy group, an aryloxycarbonyloxy group, an amino group, an acylamino group, an aminocarbonylamino group, an alkoycarbonylamino group, an aryloxycarbonylamino group, a sulfamoylamino group, an alkyl- or arylsulfonylamino group, a mercapto group, an alkylthio group, an arylthio group, a heterocyclylthio group, a sulfamoyl group, a sulfo group, an alkyl- or arylsulfinyl group, an alkyl- or arylsulfonyl group, an acyl group, an aryloxycarbonyl group, an alkoxycarbonyl group, a carbamoyl group, an aryl- or heterocyclylazo group, an imido group, a phosphino group, a phosphinyl group, a phosphinyloxy group, a phosphinylamino group, a silyl group or an ionic hydrophilic group, and far preferably represents a hydrogen atom, a halogen atom, an alkyl group, an alkenyl group, an alkynyl group, an aryl group, a heterocyclic group, a hydroxyl group, an alkoxy group, an aryloxy group, a heterocyclyloxy group, an amino group, an amino group substituted with an alkyl group, an aryl group or a heterocyclic group, a thio group, an alkyl- or arylthio group, a heterocyclylthio group or an ionic hydrophilic group. Among them, a hydrogen atom, an alkyl group in which the total number of carbon atoms is in a range of 1 to 8 or an aryl group in which the total number of carbon atoms is in a range of 6 to 12 is preferred as $A_1$ and $A_2$ each, and a hydrogen atom, an isopropyl group, a sec-butyl group or a tert-butyl group is most suitable as $A_1$ and $A_2$ each. Each of those groups may further have a substituent.

Y represents —OM or —NR$_1$R$_2$, M represents a hydrogen atom or a metal ion, and each of $R_1$ and $R_2$ independently represents a hydrogen atom, an alkyl group, an alkenyl group, an alkynyl group, an aralkyl group, an aryl group or a heterocyclic group. Y is preferably —OM. M is preferably a hydrogen atom or an alkali metal ion, far preferably an alkali metal ion. As the alkali metal ion, a lithium ion, a sodium ion or a potassium ion is preferred, and a lithium ion or a potassium ion is far preferred. To each of $R_1$ and $R_2$ in a case where Y is —NR$_1$R$_2$, the groups corresponding thereto in the descriptions given to the substituents (SUB) can be applied. Each of $R_1$ and $R_2$ is preferably a hydrogen atom, an alkyl group or an aryl group, far preferably a hydrogen atom or an alkyl group, particularly preferably a hydrogen atom.

In summary, the compounds of the formula (1) according to the invention are preferably those which include combinations of the following (a) to (c).

(a) Each of Ar$_1$ and Ar$_2$ independently represents preferably a pyrazolyl group, a thiazolyl group, an isothiazolyl group or a thiadiazolyl group, particularly preferably a pyrazolyl group or a thiadiazolyl group. The substituent which the pyrazolyl group has is preferably an alkyl group, an aryl group, a cyano group, —SO$_2$CH$_3$ or —SO$_2$Ph, and the most preferable substituent is an aryl group or a cyano group. The substituent which the thiazolyl group has is preferably an alkyl group or an aryl group.

(b) Each of $A_1$ and $A_2$ independently represents preferably a hydrogen atom, an alkyl group wherein the total number of carbon atoms is in a range of 1 to 8 or an aryl group wherein the total number of carbon atoms is in a range of 6 to 12, far preferably a hydrogen atom, an isopropyl group, a sec-butyl group or a tert-butyl group, and the most preferable one among them is a tert-butyl group.

(c) Y represents —OM or —NR$_1$R$_2$, preferably —OM. M is preferably an alkali metal ion, far preferably a lithium ion or a potassium ion. Each of $R_1$ and $R_2$ independently represents preferably a hydrogen atom or an alkyl group, particularly preferably a hydrogen atom.

Additionally, the compounds represented by the formula (1) are preferably compounds in each of which at least one of the various substituents is one which is included in the preferred groups recited above, far preferably compounds in each of which more of the substituents are those which are included in the preferred groups recited above, especially preferably compounds in each of which all of the substituents are those which are included in the preferred groups recited above.

Of the compounds represented by the formula (1), compounds represented by the following formula (8) are far preferred.

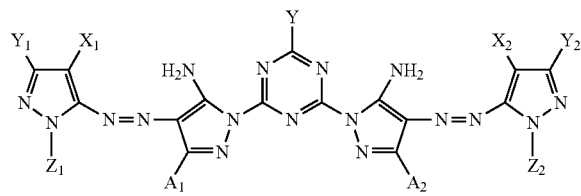

Formula (8)

$A_1$, $A_2$ and Y in the formula (8) have the same meanings as $A_1$, $A_2$ and Y in the formula (1), respectively. Each of $Y_1$ and $Y_2$ independently represents a hydrogen atom or a substituent.

Each of $X_1$ and $X_2$ independently represents an electron-withdrawing group having a Hammett's σp value of 0.20 or above.

Each of $Z_1$ and $Z_2$ independently represents a hydrogen atom, an alkyl group, an alkenyl group, an alkynyl group, an aralkyl group, an aryl group or a heterocyclic group.

The groups in the formula (8) are explained below in detail.

Detailed explanations of $A_1$, $A_2$ and Y are the same as those in the formula (1), respectively.

Each of $Y_1$ and $Y_2$ is preferably a hydrogen atom, a halogen atom, an alkyl group, an alkenyl group, an alkynyl group, an aralkyl group, an aryl group, a heterocyclic group, a cyano group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclyloxy group, an alkoxycarbonyloxy group, an aryloxycarbonyloxy group, an amino group, an amino group substituted with an alkyl group, an aryl group or a heterocyclic group, an acylamino group, an aminocarbonylamino group, a sulfamoylamino group, an alkoxycarbonylamino group, an alkyl- or arylsulfonylamino group, an aryloxycarbonylamino group, a nitro group, a thio group, an alkyl- or arylthio group, an acylthio group, a carbamoylthio group, a heterocyclylthio group, an alkoxycarbonylthio group, an aryloxycarbonylthio group, an alkyl- or arylsulfonyl group, an alkyl- or arylsulfinyl group, a sulfamoyl group, an ionic hydrophilic group or an acylamino group. To each of these groups, the corresponding group description among the descriptions given to the substituents (SUB) can be applied.

Each of $Y_1$ and $Y_2$ is far preferably a hydrogen atom, a halogen atom, an alkyl group, an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group or an alkoxycarbonyl group, particularly preferably a hydrogen atom, a halogen atom, an alkyl group, an aryl group, a cyano group, an alkylsulfonyl group, an arylsulfonyl group or a heterocyclic group. Among them, a hydrogen atom is best fit for each of $Y_1$ and $Y_2$.

Suitable examples of $X_1$ and $X_2$ which are 0.20 or above in substituent σp value include an acyl group, an acyloxy group, a carboxyl group, a carbamoyl group, an alkoxycarbonyl group, an aryloxycarbonyl group, a cyano group, a nitro group, a dialkylphosphono group, a diarylphosphono group, a diarylphosphino group, an alkylthio group, an arylthio group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another substituent having a σp value of 0.20 or above, a heterocyclic group, a halogen atom, an azo group and a selenocyanate group. To each of these groups, the corresponding group description among the descriptions given to the substituents (SUB) can be applied.

Each of $X_1$ and $X_2$ is preferably a cyano group, a carbamoyl group, an alkoxycarbonyl group, an alkylsulfonyl group, an arylsulfonyl group or a halogen atom, far preferably a cyano group, an alkoxycarbonyl group, an alkylsulfonyl group or an arylsulfonyl group, especially preferably a cyano group, an alkylsulfonyl group or an arylsulfonyl group. Of these groups, a cyano group is best fit for $X_1$ and $X_2$ each.

Suitable examples of $Z_1$ and $Z_2$ include an alkyl group, a cycloalkyl group, an aralkyl group, an alkenyl group, an alkynyl group, an aryl group, a heterocyclic group, an alkylsulfinyl group, an arylsulfinyl group, an alkylsulfonyl group, an arylsulfonyl group, an acyl group, an aryloxy group, an aryloxycarbonyl group, an alkoxycarbonyl group, a carbamoyl group, a phosphino group, a phosphinyl group and a silyl group. Each of these groups may further have a substituent.

Of these groups, an alkyl group, an aryl group, a heterocyclic group, an alkylsulfonyl group, an arylsulfonyl group, an acyl group (preferably an arylcarbonyl group) or a carbamoyl group is particularly suitable as each of $Z_1$ and $Z_2$, and a substituted aryl group is preferred over the others.

In summary, the compounds of the formula (8) according to the invention are preferably those which include combinations of the following (a) to (e).

(a) Each of $Y_1$ and $Y_2$ independently represents preferably a hydrogen atom in particular, a halogen atom, an alkyl group, an aryl group, a cyano group, an alkylsulfonyl group, an arylsulfonyl group or a heterocyclic group, and among them a hydrogen atom is most suitable.

(b) Each of $A_1$ and $A_2$ independently represents preferably a hydrogen atom, an alkyl group in which the total number of carbon atoms is in a range of 1 to 8 or an aryl group in which the total number of carbon atoms is in a range of 6 to 12, far preferably an isopropyl group, a sec-butyl group or a tert-butyl group, especially preferably a tert-butyl group.

(c) Each of $X_1$ and $X_2$ represents preferably a cyano group, an alkylsulfonyl group or an arylsulfonyl group, far preferably a cyano group.

(d) Each of $Z_1$ and $Z_2$ independently represents preferably an alkyl group, an aryl group, a heterocyclic group, an alkylsulfonyl group, an arylsulfonyl group, an acyl group, an arylcarbonyl group or a carbamoyl group, far preferably a substituted aryl group. The substituted aryl group is preferably a phenyl group having sulfo groups or carboxyl groups as at least two (preferably two) substituents.

(e) Y is preferably —OM. M is preferably an alkali metal ion. Of alkali metal ions, a lithium ion or a potassium ion is far preferred as M.

Additionally, the compounds represented by the formula (8) are preferably compounds in each of which at least one of the various substituents is one which are included in the preferred groups recited above, far preferably compounds in each of which more of the substituents are those which are included in the preferred groups recited above, especially preferably compounds in each of which all of the substituents are those which are included in the preferred groups recited above.

Of the compounds represented by the formula (8), compounds represented by the following formula (9) are further preferred.

Formula (9)

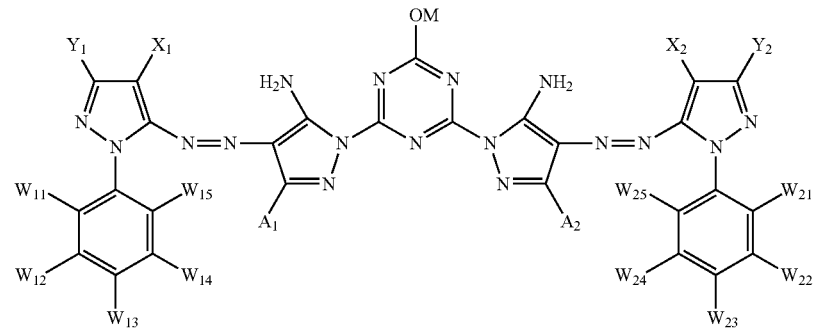

In the formula (9), $A_1$, $A_2$, $X_1$, $X_2$, $Y_1$ and $Y_2$ have the same meanings as $A_1$, $A_2$, $X_1$, $X_2$, $Y_1$ and $Y_2$ in the formula (8), respectively. Each of $W_{11}$, $W_{12}$, $W_{13}$, $W_{14}$, $W_{15}$, $W_{21}$, $W_{22}$, $W_{23}$, $W_{24}$ and $W_{25}$ independently represents a hydrogen atom or a substituent.

M represents a hydrogen atom or a metal ion.

The groups in the formula (9) are explained below in detail.

$A_1$ and $A_2$ have the same meanings as in the detailed explanation of the formula (1).

$Y_1$ and $Y_2$ have the same meanings as in the detailed explanation of the formula (8).

$X_1$ and $X_2$ have the same meanings as in the detailed explanation of the formula (8).

Each of $W_{11}$, $W_{12}$, $W_{13}$, $W_{14}$, $W_{15}$, $W_{21}$, $W_{22}$, $W_{23}$, $W_{24}$ and $W_{25}$ is preferably a hydrogen atom, a halogen atom, an alkyl group, an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including a salt thereof), a carboxyl group (including a salt thereof), a hydroxyl group (which may be any salt thereof), a phosphono group (which may be any salt thereof) or a quaternary ammonium. Among them, a hydrogen atom, a halogen atom, an alkyl group, a sulfo group (including a salt thereof), a carboxyl group (including a salt thereof), a hydroxyl group (which may be any salt thereof) (including a salt thereof) are preferred to the others, and a hydrogen atom, a sulfo group (including a salt thereof) and a carboxyl group (including a salt thereof) are far preferred. In particular, it is preferable that at least one of $W_{11}$, $W_{12}$, $W_{13}$, $W_{14}$ and $W_{15}$ is a sulfo group (including a salt thereof) or a carboxyl group (including a salt thereof) and at least one of $W_{21}$, $W_{22}$, $W_{23}$, $W_{24}$ and $W_{25}$ is a sulfo group (including a salt thereof) or a carboxyl group (including a salt thereof). Cases where two of $W_{11}$ to $W_{15}$ and two of $W_{21}$ to $W_{25}$ are carboxyl groups (including salts thereof) and the others are hydrogen atoms are preferred. To each of the halogen atom, the alkyl group, the aryl group, the heterocyclic group, the cyano group, the alkoxy group, the acylamino group, the aminocarbonylamino group, the alkylsulfonylamino group, the arylsulfonylamino group, the sulfamoyl group, the alkylsulfonyl group, the arylsulfonyl group, the carbamoyl group and the alkoxdycarbonyl group, the corresponding group description among the descriptions given to the substituents (SUB) can be applied.

M is a hydrogen atom or a metal ion, preferably a hydrogen atom or an alkali metal ion, far preferably an alkali metal ion. Of alkali metal ions, a lithium ion, a sodium ion or a potassium ion, especially a lithium ion or a potassium ion, is preferred as M.

In summary, the compounds of the formula (9) according to the invention are preferably those which include combinations of the following (a) to (e).

(a) Each of $Y_1$ and $Y_2$ independently represents preferably a hydrogen atom in particular, a halogen atom, an alkyl group, an aryl group, a cyano group, an alkylsulfonyl group, an arylsulfonyl group or a heterocyclic group, far preferably a hydrogen atom or an alkyl group, especially preferably a hydrogen atom.

(b) Each of $A_1$ and $A_2$ independently represents preferably a hydrogen atom, an alkyl group in which the total number of carbon atoms is in a range of 1 to 8 or an aryl group in which the total number of carbon atoms is in a range of 6 to 12, far preferably an isopropyl group, a sec-butyl group or a tert-butyl group, especially preferably a tert-butyl group.

(c) Each of $X_1$ and $X_2$ independently represents preferably a cyano group, an alkylsulfonyl group or an arylsulfonyl group, far preferably a cyano group.

(d) Each of $W_{11}$, $W_{12}$, $W_{13}$, $W_{14}$, $W_{15}$, $W_{21}$, $W_{22}$, $W_{23}$, $W_{24}$ and $W_{25}$ independently represents preferably a hydrogen atom, a sulfo group (including a salt thereof) or a carboxyl group (including a salt thereof). In particular, cases where at least one of $W_{11}$, $W_{12}$, $W_{13}$, $W_{14}$ and $W_{15}$ is a sulfo group (including a salt thereof) or a carboxyl group (including a salt thereof) and at least one of $W_{21}$, $W_{22}$, $W_{23}$, $W_{24}$ and $W_{25}$ is a sulfo group (including a salt thereof) or a carboxyl group (including a salt thereof) are preferred. And cases where two of $W_{11}$ to $W_{15}$ and two of $W_{21}$ to $W_{25}$ are carboxyl groups (including salts thereof) are preferred.

(e) M is preferably an alkali metal ion. Among alkali metal ions, a lithium ion or a potassium ion is far preferred as M.

Additionally, the compounds represented by the formula (9) are preferably compounds in each of which at least one of the various substituents is one which is included in the preferred groups recited above, far preferably compounds in each of which more of the substituents are those which are included in the preferred groups recited above, especially preferably compounds in each of which all of the substituents are those which are included in the preferred groups recited above.

Of the compounds represented by the formula (1), compounds represented by the following formula (10) are far preferred.

Formula (10)

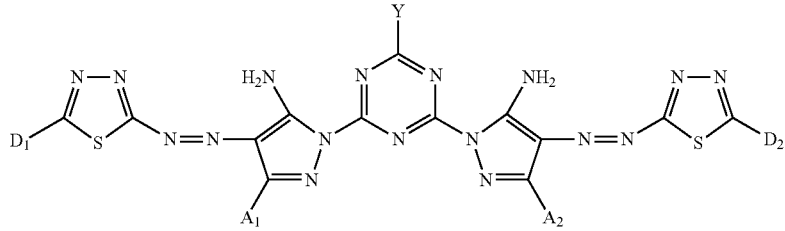

$A_1$, $A_2$ and Y in the formula (10) have the same meanings as $A_1$, $A_2$ and Y in the formula (1), respectively. Each of $D_1$ and $D_2$ independently represents a hydrogen atom or a substituent.

Details of the substituents are given below.

$A_1$ and $A_2$ have the same meanings as the details given in descriptions of the formula (1).

Y has the same meaning as the detail given in the description of the formula (1).

Suitable examples of one which $D_1$ and $D_2$ each represent independently include a hydrogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclyloxy group, an acyloxy group, a carbamoyloxy group, an alkoxycarbonyloxy group, an aryloxycarbonyloxy group, an amino group (including an alkylamino group and an arylamino group), an acylamino group (an amido group), an aminocarbonylamino group (an ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclylthio group, a sulfamoyl group, an alkylsulfinyl group, an arylsulfinyl group, an alkylsulfonyl group, an arylsulfonyl group, an acyl group, an aryloxycarbonyl group, an alkyloxycarbonyl group, a carbamoyl group, a phosphino group, a phosphinyl group, a phosphinyloxy group, a phosphinylamino group, a silyl group, an azo group and an imino group. To each of these groups, the corresponding group description among the descriptions given to the substituents (SUB) can be applied. Each group may further have a substituent.

More suitable examples of a group which $D_1$ and $D_2$ each represent independently include a substituted alkyl group, a substituted aryl group, a substituted heterocyclic group, a substituted alkylthio group, a substituted arylthio group, a substituted heterocyclylthio group, a substituted alkylamino group and a substituted arylamino group. Of these groups, a substituted aryl group and a substituted arylthio group are preferred, and a substituted aryl group in particular is preferred. The substituted aryl group is preferably a phenyl group having at least two (preferably two) sulfo or carboxyl groups.

In summary, the compounds of the formula (10) according to the invention are preferably those which include combinations of the following (a) to (c).

(a) Each of $A_1$ and $A_2$ independently represents preferably a hydrogen atom, an alkyl group in which the total number of carbon atoms is in a range of 1 to 8 or an aryl group in which the total number of carbon atoms is in a range of 6 to 12, far preferably an isopropyl group, a sec-butyl group or a tert-butyl group, especially preferably a tert-butyl group.

(b) Each of $D_1$ and $D_2$ independently represents preferably a substituted alkyl group, a substituted aryl group, a substituted heterocyclic group, a substituted alkylthio group, a substituted arylthio group or a substituted heterocyclylthio group. Of these groups, a substituted aryl group and a substituted arylthio group are preferred, and a substituted aryl group in particular is preferred. The substituted aryl group is preferably a phenyl group having at least two (preferably two) sulfo or carboxyl groups.

(c) Y is preferably —OM. M is preferably an alkali metal ion. As the alkali metal ion, a lithium ion or a potassium ion is preferred.

Additionally, the compounds represented by the formula (10) are preferably compounds in each of which at least one of the various substituents is one which is included in the preferred groups recited above, far preferably compounds in each of which more of the substituents are those which are included in the preferred groups recited above, especially preferably compounds in each of which all of the substituents are those which are included in the preferred groups recited above.

Of the compounds represented by the formula (10), compounds represented by the following formula (11) are further preferred.

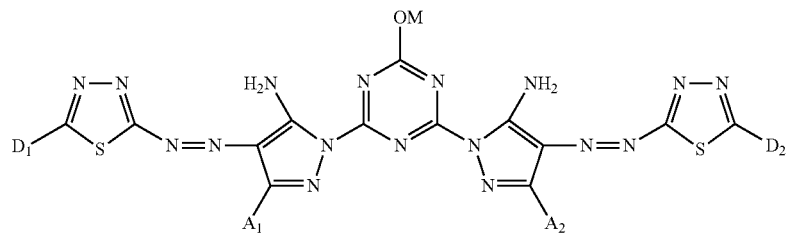

Formula (11)

$A_1$, $A_2$, $D_1$ and $D_2$ in the formula (11) have the same meanings as $A_1$, $A_2$, $D_1$ and $D_2$ in the formula (10), respectively. M has the same meaning as M in the formula (1).

Details of the substituents in the formula (11) are given below.

$A_1$ and $A_2$ have the same meanings as the details given in the description of the formula (1).

$D_1$ and $D_2$ have the same meanings as the details given in the description of the formula (10).

M has the same meaning as the detail given in the description of the formula (1).

In summary, the compounds of the formula (11) according to the invention are preferably those which include combinations of the following (a) to (c).

(a) Each of $A_1$ and $A_2$ independently represents preferably a hydrogen atom, an alkyl group in which the total number of carbon atoms is in a range of 1 to 8 or an aryl group in which the total number of carbon atoms is in a range of 6 to 12, far preferably an isopropyl group, a sec-butyl group or a tert-butyl group, especially preferably a tert-butyl group.

(b) Each of $D_1$ and $D_2$ independently represents preferably a substituted alkyl group, a substituted aryl group, a substituted heterocyclic group, a substituted alkylthio group, a substituted arylthio group or a substituted heterocyclylthio group. Of these groups, a substituted aryl group and a substituted arylthio group are preferred, and a substituted aryl group in particular is preferred. The substituted aryl group is preferably a phenyl group having at least two (preferably two) sulfo or carboxyl groups.

(c) M is preferably an alkali metal ion. As the alkali metal ion, a lithium ion or a potassium ion is far preferred.

Additionally, the compounds represented by the formula (11) are preferably compounds in each of which at least one of the various substituents is one which is included in the preferred groups recited above, far preferably compounds in each of which more of the substituents are those which are included in the preferred groups recited above, especially preferably compounds in each of which all of the substituents are those which are included in the preferred groups recited above.

Examples of compounds represented by the formula (1) are illustrated below, but the invention should not be construed as being limited to these examples.
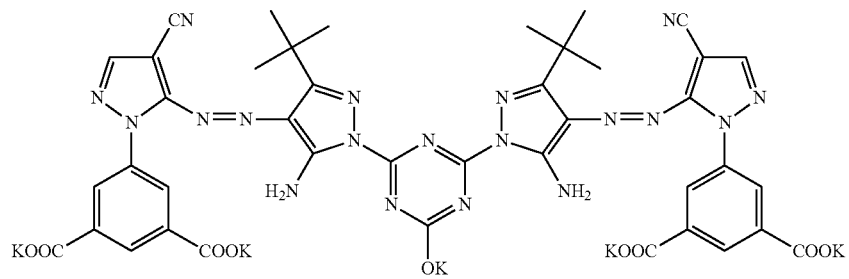
Compound 1
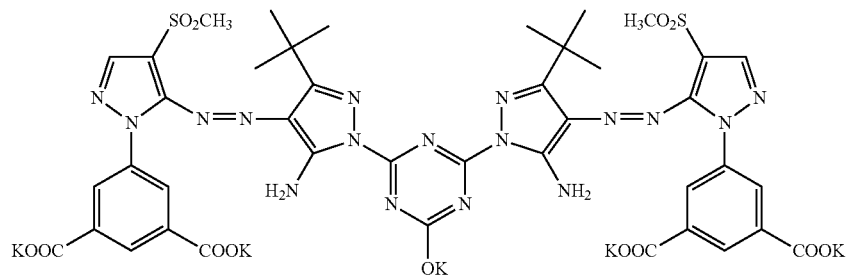
Compound 2
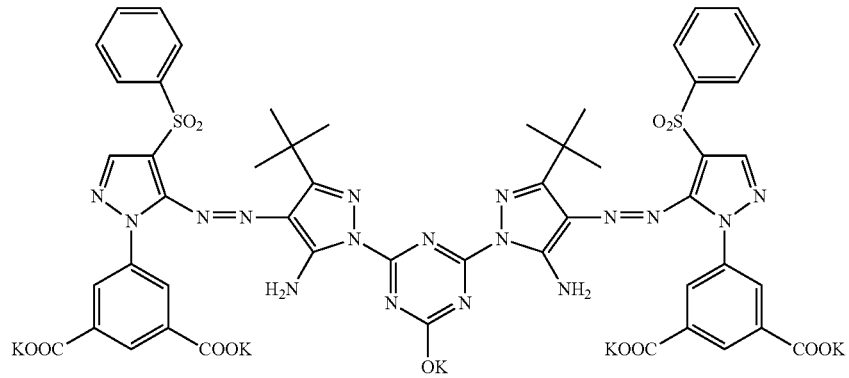
Compound 3
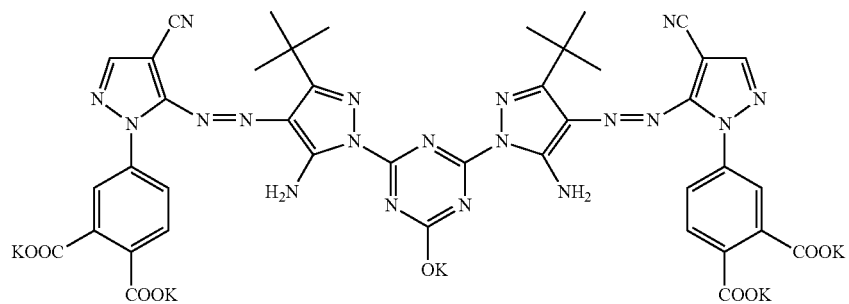
Compound 4

-continued
Compound 5
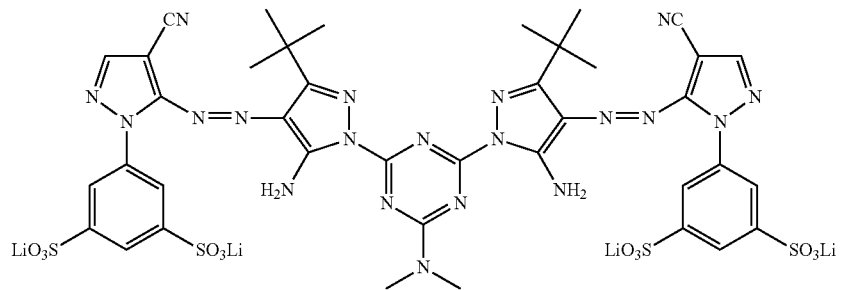
Compound 6
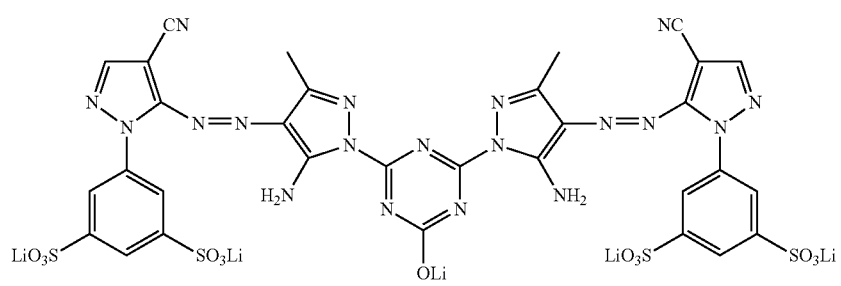
Compound 7
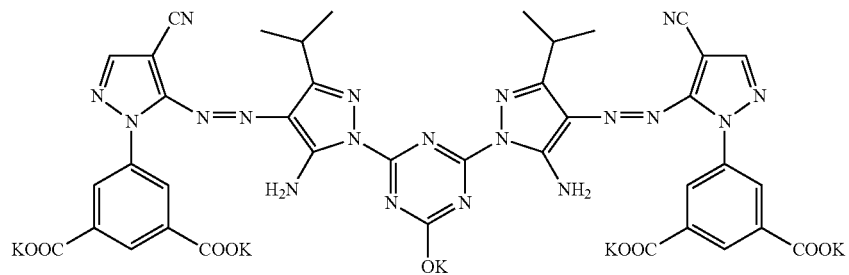
Compound 8
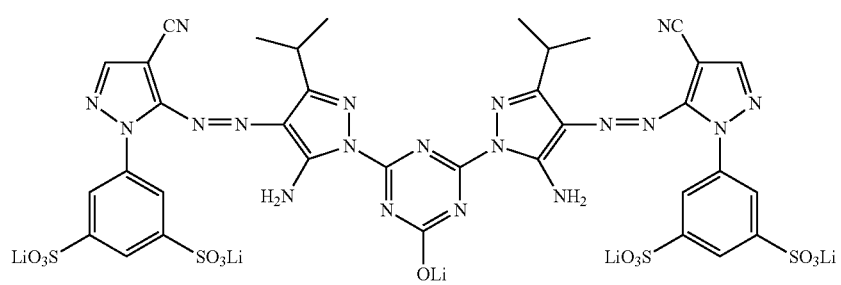
Compound 9
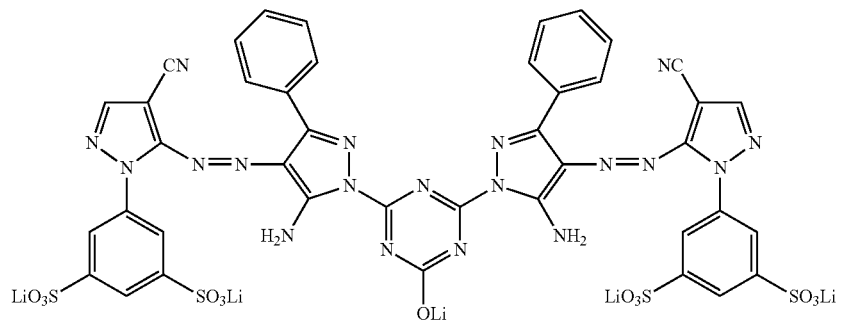

Compound 10
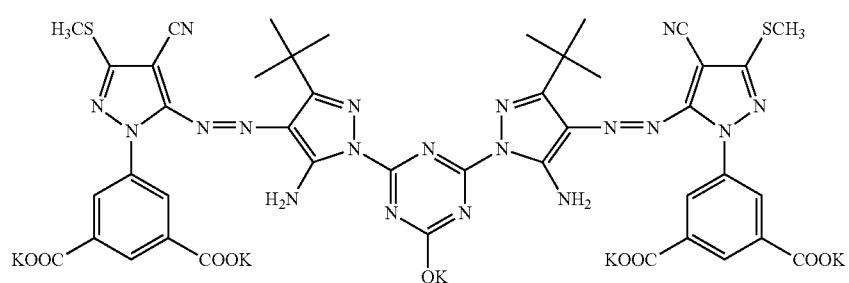
Compound 11
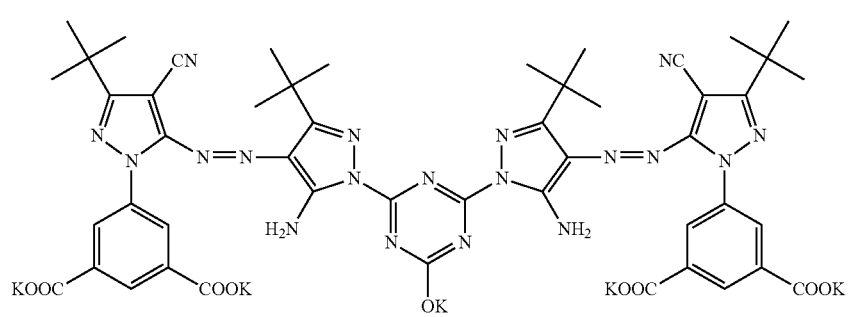
Compound 12
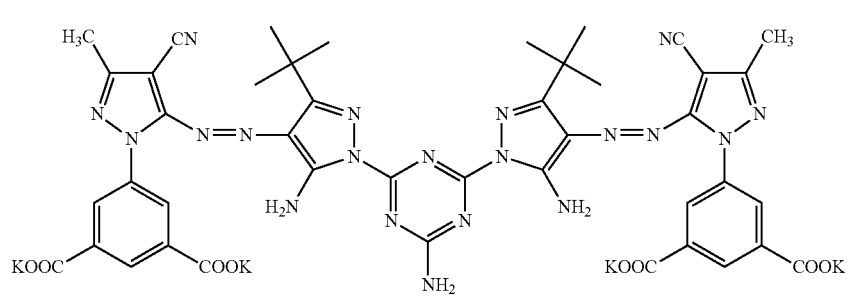
Compound 13
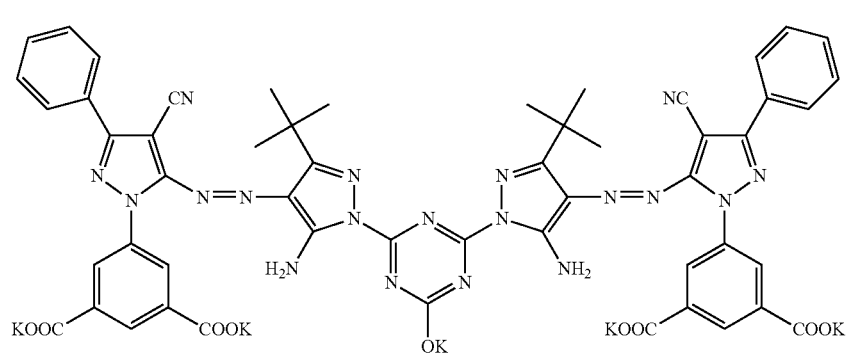
Compound 14
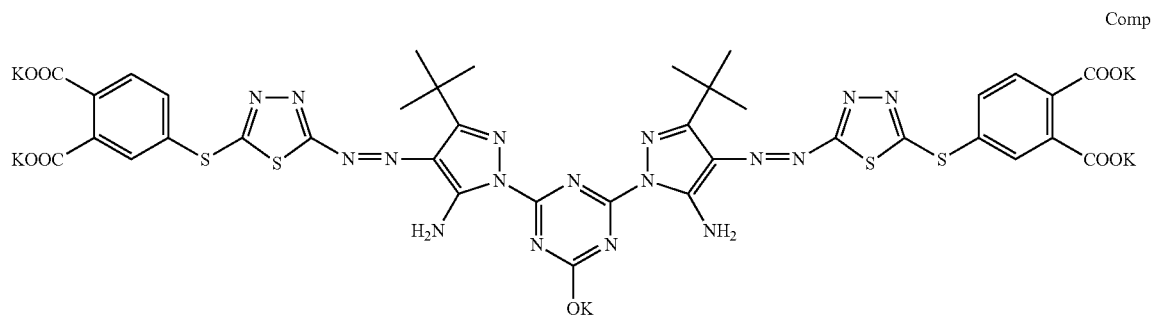

-continued
Compound 15
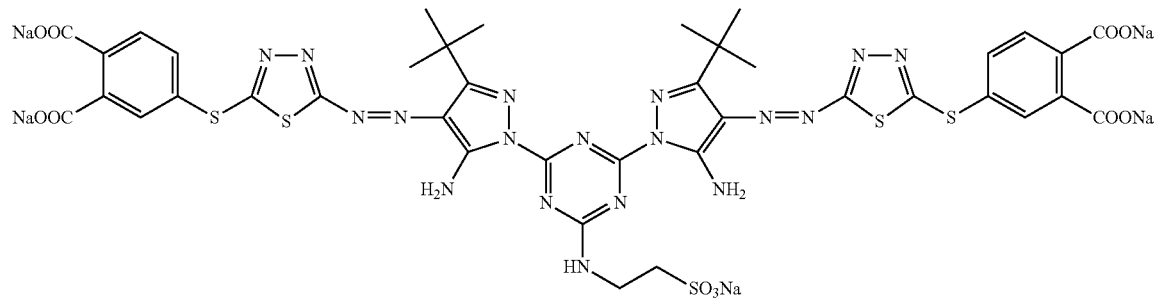
Compound 16
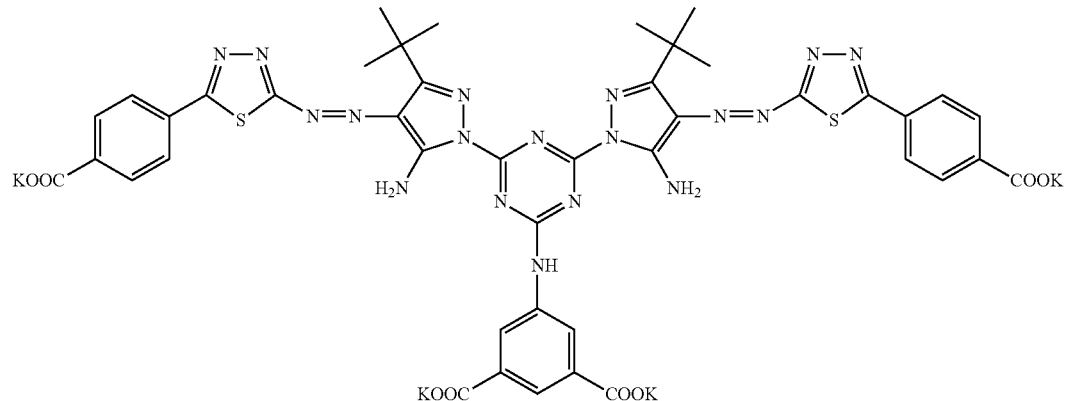
Compound 17
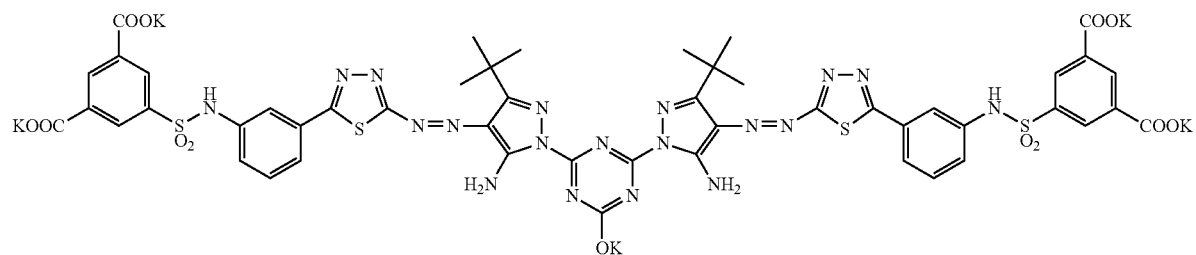
Compound 18
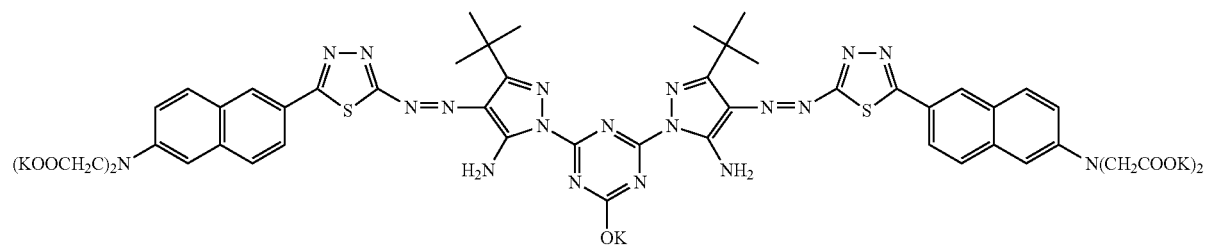
Compound 19
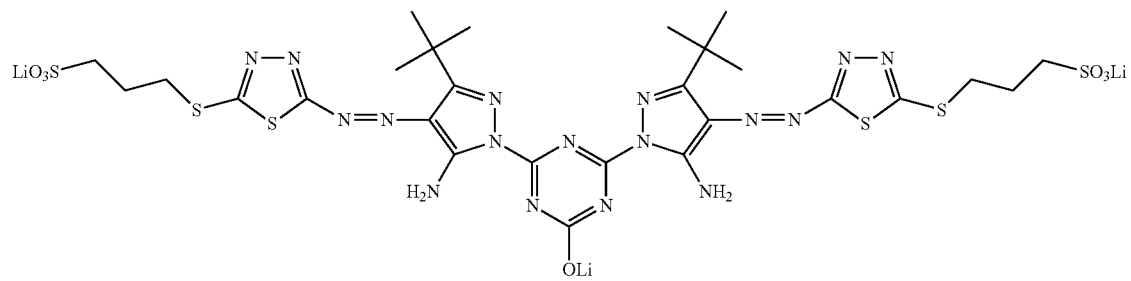

-continued
Compound 20
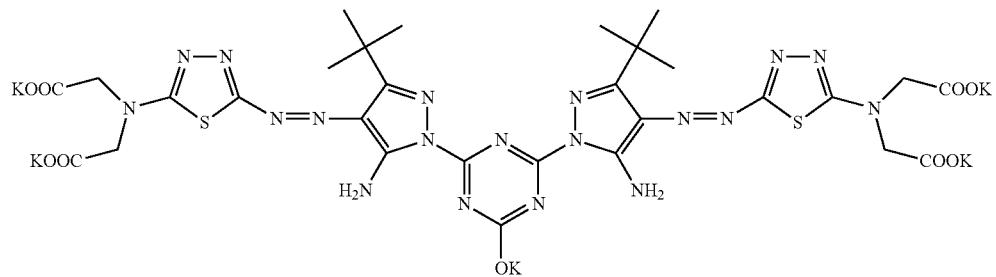
Compound 21
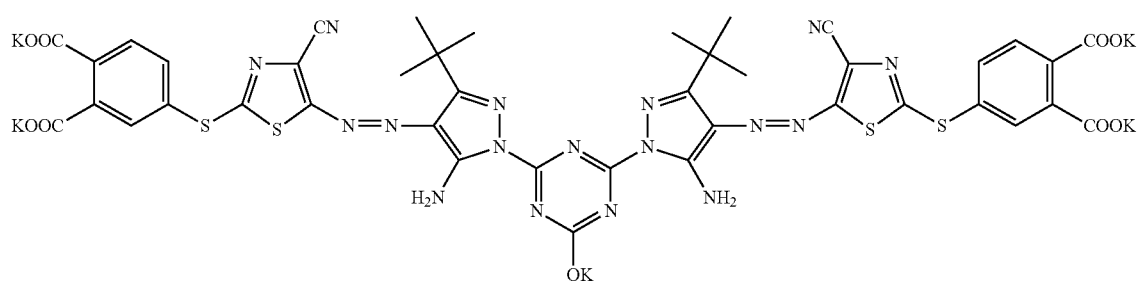
Compound 22
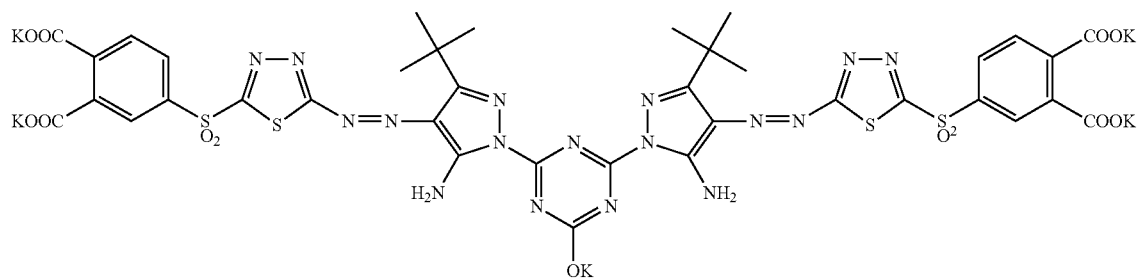
Compound 23
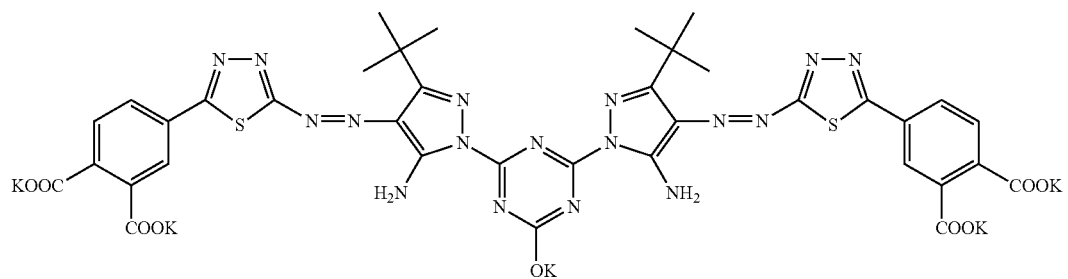
Compound 24
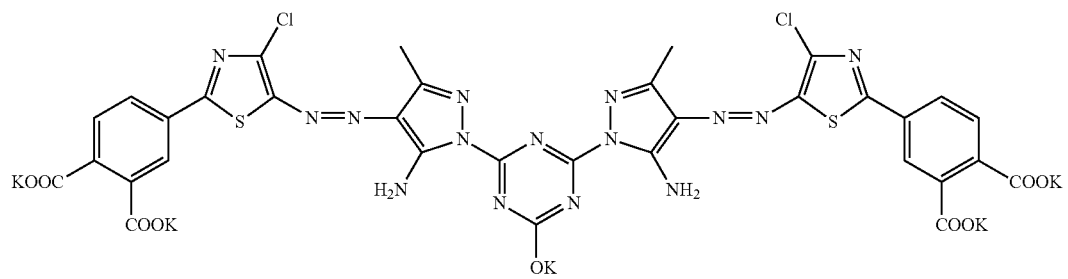

-continued
Compound 25
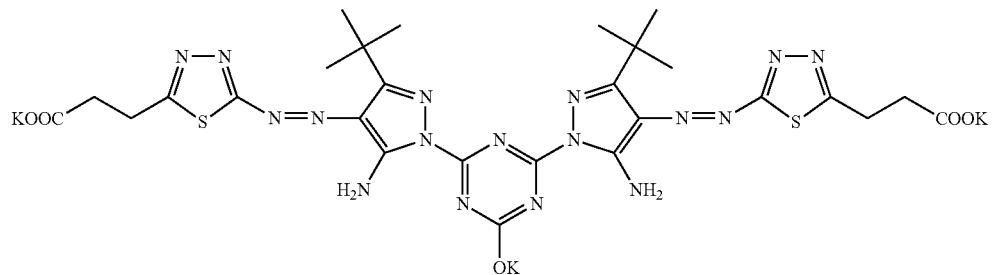
Compound 26
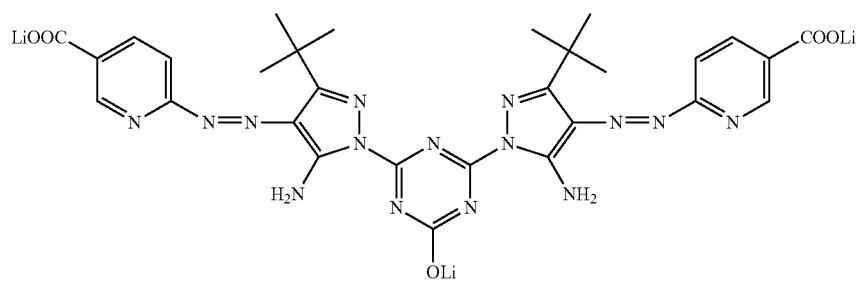
Compound 27
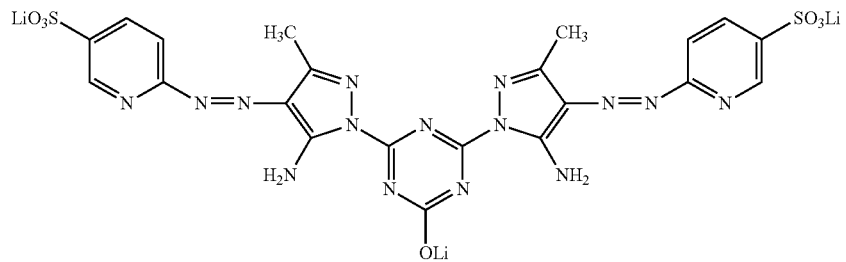
Compound 28
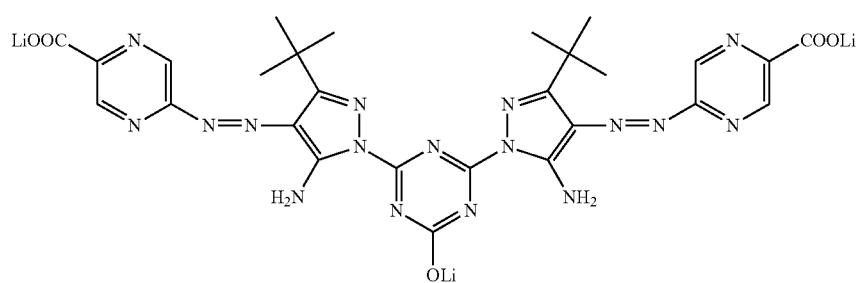
Compound 29
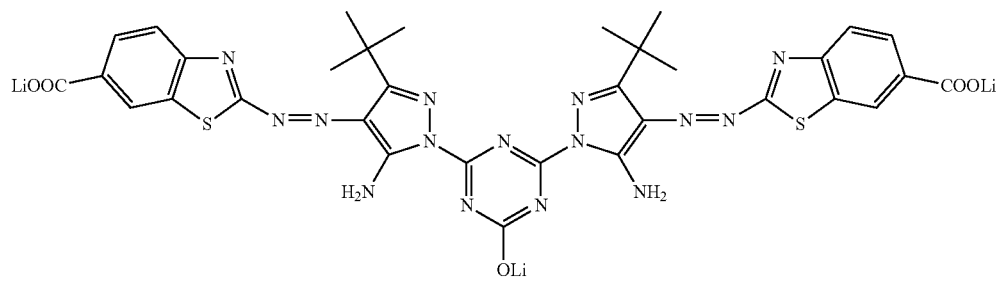

Compound 30
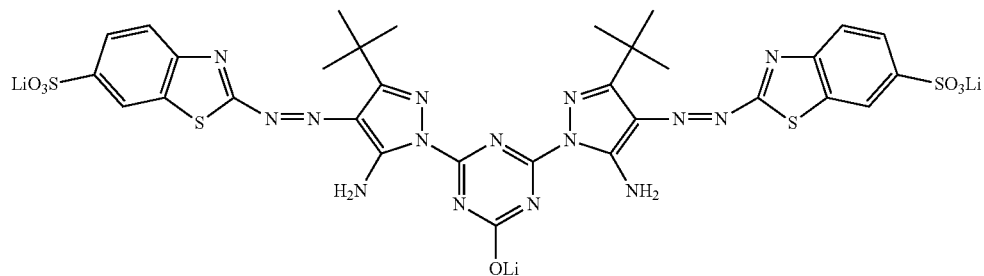

Compound 31
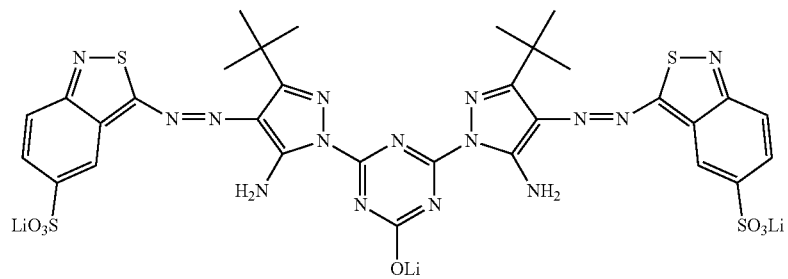

Compound 32
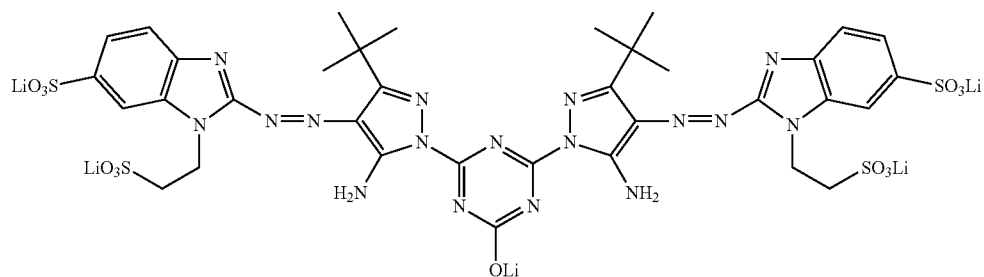

Compound 33
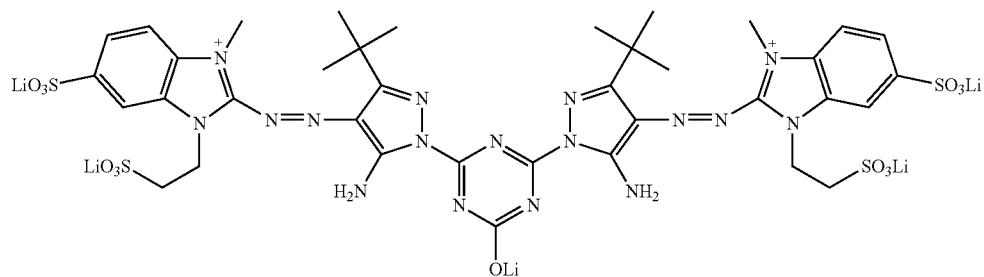

These compounds are synthesized according to the synthesis methods disclosed in JP-A-2006-57076 and JP-A-2007-217681.

The compounds represented by the formula (1) are used in an ink composition in a concentration of 0.1 mass % to lower than 7.0 mass %, preferably 0.1 mass % to 6.8 mass %, far preferably 0.5 mass % to 6.7 mass %, on a solids basis.

<Ingredient (C)>

The present ink composition is characterized by having an ingredient (C) in addition to a compound represented by the formula (1) and moisture-retentive agents. The ingredient (C) is at least one compound selected from C.I. Direct Yellow 59, id. 86, id. 132, id, 173, C.I. Acid Yellow 23 or compounds represented by the following formulae (2) to (6). The ingredient (C) is preferably at least one compound selected from C.I. Direct Yellow 59, id. 173, C.I. Acid Yellow 23 or the compounds of the following formulae (2) to (6), far preferably at least one compound selected from among the compounds of the following formulae (2) to (6). Herein, however, M in the formulae (2) to (5) each represents a hydrogen atom or a metal ion. R in the formula (2) represents a hydrogen atom or a methyl group. And M'⁻ in the formula (6) represents a halide ion, an inorganic anion or an organic anion.

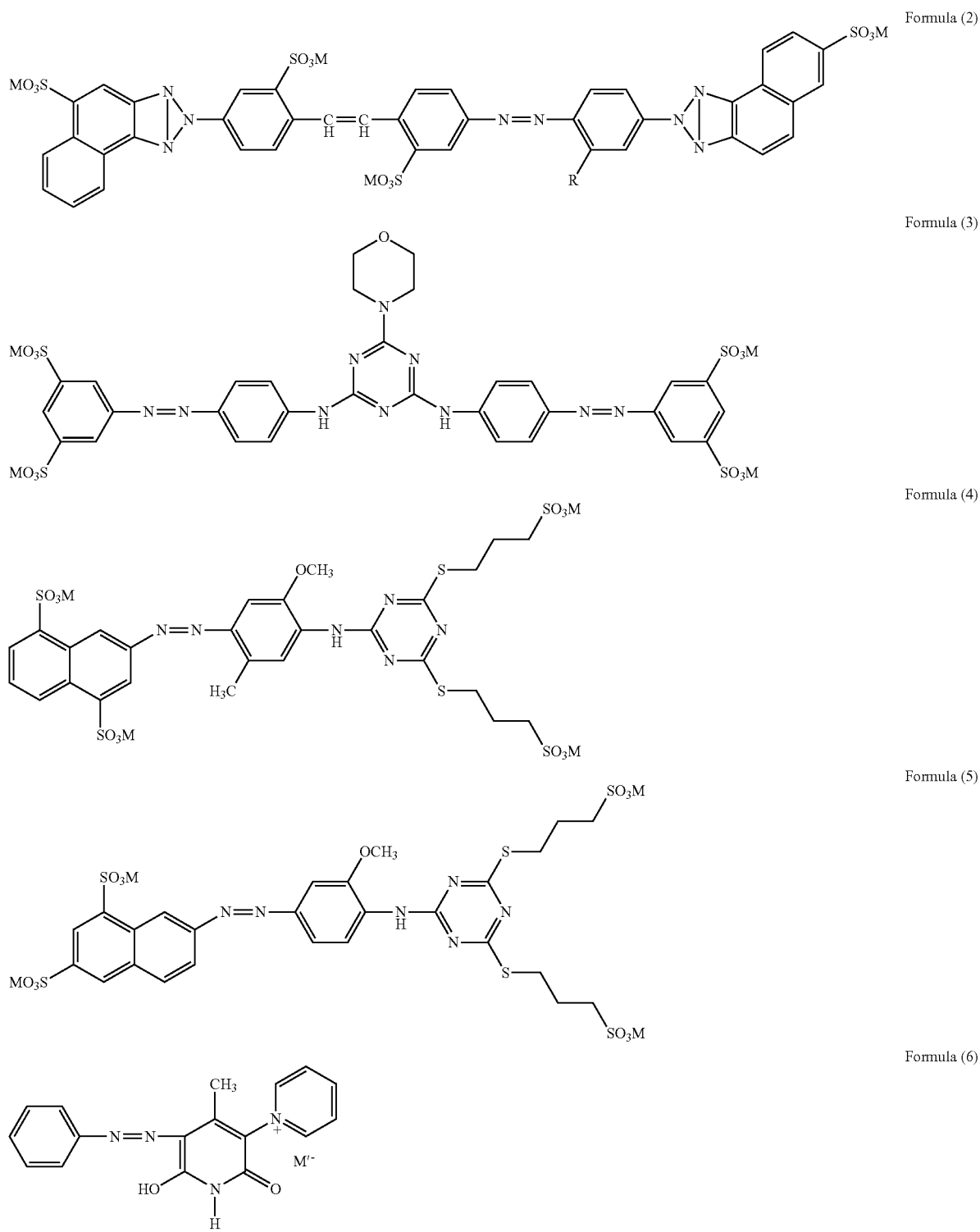

Formula (2)
Formula (3)
Formula (4)
Formula (5)
Formula (6)

By its addition to an ink composition, the ingredient (C), together with compounds of the formula (1), is supposed to form an associated product, and has been found to do no harm to the color reproduction region of every compound of the formula (1). A factor responsible for this phenomenon is supposed to be π-planarity of the ingredient (C) higher than those of other color materials. However, the invention should not be construed as being restricted by such a supposition.

Then M in the formulae (2) to (5) each is explained. M represents a hydrogen atom or a metal ion, preferably a metal ion. Of metal ions, an alkali metal ion is preferred as the metal ion represented by M. Examples of an alkali metal ion represented by M include a lithium ion, a sodium ion and a potassium ion. Of these ions, a lithium ion or a potassium ion is preferred as M.

$M^{r-}$ in the formula (6) is explained. $M^{r-}$ represents a halide ion, an inorganic anion or an organic anion. Suitable examples of the halide ion include a fluoride ion, a chloride ion and a bromide ion, those of the inorganic anion include a nitrate ion, a sulfate ion, a tetrafluoroborate ion and a hexafluorophosphate ion, and those of the organic anion include a methanesulfonate ion, a trifluoromethanesulfonate ion, a nonafluorobutanesulfonate ion and a p-toluenesulfonate ion. As $M^{r-}$, a halide ion is preferred, and a chloride ion is far preferred.

The addition amount of an ingredient (C) is explained. The amount of the ingredient (C) added to an ink composition is preferably lower than 7.0 mass %, far preferably from 0.1 mass % to lower than 7.0 mass %, further preferably from 0.2 mass % to 5.0 mass %. The addition amount of an ingredient (C) is preferably 0.01 to 10 times by mass, far preferably 0.05 to 5 times by mass, further preferably 0.5 to 4 times, as much as that of a compound of the formula (1).

<Ink Composition>

An ink composition preferred in the invention (sometimes the term "ink composition" is abbreviated as "ink") is ink containing at least a compound represented by the formula (1), moisture-retentive agents, an ingredient (C) and water. However, a moisture-retentive agent having 3 or more hydroxyl groups, which is included among the moisture-retentive agents, needn't be added. The present ink can contain a medium. The ink using a solvent as the medium is suitable for inkjet recording ink in particular. The present ink can be prepared by using as a medium a lipophilic medium or an aqueous medium and dissolving and/or dispersing in such a medium a compound represented by the formula (1), an ingredient (C) as a color material and solid additives. The medium is preferably an aqueous medium. Media has various functions. They are effective as not only a moisture-retentive agent for prevention of clogging of nozzle caused by drying in an ink jet and a penetration promoter for allowing better penetration of ink into paper, but also an ultraviolet absorber, an antioxidant, an antifoaming agent, a viscosity adjuster, a surface tension adjuster, a dispersant, a dispersion stabilizer, an antifungal agent, a rust inhibitor, a pH adjuster and so on, and therefore a combined use of media makes it possible to adjust or improve physical properties and quality of an ink composition.

In the case of dispersing a compound represented by the formula (1) and an ingredient (C) which are used in the invention into an aqueous medium, it is preferable to adopt such a method as described in JP-A-11-286637, JP-A-2001-240763, JP-A-2001-262039 or JP-A-2001-247788, wherein colored fine particles containing a dye and an oil-soluble polymer are dispersed into an aqueous medium, or it is preferable that, as in JP-A-2001-262018, JP-A-2001-240763, JP-A-2001-335734 and JP-A-2002-80772, a compound represented by the formula (1) and an ingredient (C) are dissolved in a high boiling organic solvent and dispersed into an aqueous medium. To the concrete method by which a compound represented by the formula (1) and an ingredient (C) which are used in the invention are dispersed into an aqueous medium, the oil-soluble polymers, high boiling organic solvents and additives which are usable in the invention and the amounts in which they are used, those described in the foregoing patent documents can be applied suitably. Alternatively, a compound of the formula (1) and an ingredient (C) may be dispersed in a state of fine particles as they are solid. At the time of dispersion, a dispersant and a surfactant can be used. As a dispersing device, it is possible to use a simple stirrer, an impeller agitation system, an in-line agitation system, a mill system (e.g. a colloid mill, a ball mill, a sand mill, an attrition mill, a roll mill, an agitator mill), an ultrasonic system or a high-pressure emulsifying dispersion system (a high-pressure homogenizer, commercially available ones of which include: a Manton-Gaulin homogenizer, a microfluidizer and DeBEE 2000). As to methods for preparing the inkjet recording ink, details thereof are described in each of JP-A-5-148436, JP-A-5-295312, JP-A-7-97541, JP-A-7-82515, JP-A-7-118584, JP-A-11-286637 and JP-A-2001-271003 in addition to the patent documents cited above, and can be utilized for preparing the present inkjet recording ink too.

The present ink composition is an ink composition which contains a compound represented by the formula (1) and moisture-retentive agents, what's more which is from 0.1 mass % to lower than 7.0 mass % in content of compound represented by the formula (1), 10.0 mass % or lower in content of moisture-retentive agent having 3 or more hydroxyl groups and lower than 30.0 in molar ratio of the moisture-retentive agent having 3 or more hydroxyl groups to the compound represented by the formula (1).

The present ink composition (preferably the present ink composition for inkjet recording) is used in a condition that it contains a compound represented by the formula (1) in an amount from 0.1 mass % to lower than 7.0 mass % on a solid basis per 100 parts by mass thereof, or equivalently, the content of compound represented by the formula (1) is from 0.1 mass % to lower than 7.0 mass %. The content of compound represented by the formula (1) is preferably from 0.1 mass % to 6.8 mass %, far preferably from 0.5 mass % to 6.7 mass %.

When a compound represented by the formula (1) according to the invention is used in an aqueous medium, a preferred embodiment of the present ink composition is an aqueous ink composition which contains at least water, the compound represented by the formula (1), moisture-retentive agents and an ingredient (C), what's more which is from 0.1 mass % to lower than 7.0 mass % in content of compound represented by the formula (1), 10.0 mass % or lower in content of moisture-retentive agent having 3 or more hydroxyl groups and lower than 30.0 in molar ratio of the moisture-retentive agent having 3 or more hydroxyl groups to the compound represented by the formula (1), preferably which further contains a moisture-retentive agent having two or less hydroxyl group. A moisture-retentive agent having two or less hydroxyl group and a moisture-retentive agent having three or more hydroxyl groups are also added for other uses e.g. as a drying preventive, a penetration promoter, a humectant and so on, but their uses are not limited to these ones. For instance, triethanolamine is effective as not only a moisture-retentive agent but also a pH adjuster. In this case, triethanolamine is subject to the quantitative restriction set on the moisture-retentive agents. Detailed descriptions of moisture-retentive agents are given below.

Moisture-retentive agents usable in the invention are explained. The term "moisture-retentive agent" refers to the matter which dissolves in an ink composition to contain at least a moisture-retentive agent and has a function of lessening vaporization of water. By utilizing such properties, the ink composition can avoid drying (concentration) as one of factors responsible e.g. for precipitation of color materials from the ink composition. The moisture-retentive agents used in the invention are preferably hydrophilic organic solvents having boiling temperatures higher than water, provided that they are in a liquid state at 25° C., or preferably compounds soluble in water, provided that they are solid matter at 25° C., and more specifically, solid moisture-retentive agents whose water solubility is 0.1 mass % or higher, preferably 0.2 mass % or higher, far preferably 0.5 mass % or higher. The term "hydrophilic organic solvent" as used herein refers to the organic solvent which, when mixed with water in certain ratios, creates a homogeneous state without causing liquid separation. The water solubility of an aqueous organic solvent at 25° C. (referred to as reciprocal solubility too) is preferably 5 mass % or higher, far preferably 10 mass % or higher, further preferably 20 mass % or higher. In addition, the aqueous organic solvent is one which has a boiling temperature of 100° C. or higher, preferably 105° C. or higher, far preferably 110° C. or higher.

In general, examples of a moisture-retentive agent include polyhydric alcohol derivatives, glycol ether derivatives, alkylamine derivatives, urea derivatives, derivatives of carboxylic acids and their salts, derivatives of amino acids and their salts, and sugar derivatives. Of these derivatives, preferred ones are polyhydric alcohol derivatives, glycol ether derivatives, alkylamine derivatives, urea derivatives and derivatives of carboxylic acids and their salts, far preferred ones are polyhydric alcohol derivatives, glycol ether derivatives, alkylamine derivatives and urea derivatives, and particularly preferred ones are urea derivatives. The term "derivatives" as used herein refers to the compounds modified with appropriate substituents through substitution reactions such as alkylation, arylation, heterocyclation, esterification, etherification, halogenations, amidation, hydroxylation and amination.

Of such moisture-retentive agents, compounds having molecular weights of 1,000 or below are preferred, compounds having molecular weights of 900 or below are far preferred, and compounds having molecular weights of 800 or below are further preferred. Moisture-retentive agents can be broadly classified by the presence or absence of hydroxyl groups. Moisture-retentive agents having hydroxyl groups are explained below by use of concrete examples.

Examples of a moisture-retentive agent having 3 or more hydroxyl groups include polyhydric alcohols (such as glycerin, erythritol, cyclohexanetriol, butanetriol, trishydroxymethylethane, trimethylolpropane, trimethylolethane, 1,2,6-hexanetriol, heptanetriol, threitol, adonitol, xylitol, sorbitol, mannitol, inositol and benzenetriol), ether derivatives (such as dipentaerythritol), alcoholamines (such as triethanolamine, trishydroxymethylaminomethane, tetrakishydroxypropylethylenediamine, pentrol, glucosamine and sodium hyaluronate) and urea derivatives such as tetrahydroxyethylurea. Among them, glycerin, erythritol, cyclohexanetriol, trishydroxymethylethane, trimethyolopropane, sorbitol, inositol, benzenetriol, dipentaerythritol, triethanolamine, trishydroxymethylaminomethane, pentrol and glucosamine are preferable to the others, and far preferred ones are glycerin, trimethylolpropane, triethanolamine and trishydroxymethylaminomethane.

The content of moisture-retentive agent having 3 or more hydroxyl groups in an ink composition is preferably 10.0 mass % or lower, far preferably 8.5 mass % or lower, further preferably 4.0 mass % or lower. And it is far preferred that the content of moisture-retentive agent having 3 or more hydroxyl groups in an ink composition be preferably from 0.01 mass % to 10.0 mass %, far preferably from 0.01 mass % to 8.5 mass %, further preferably from 0.01 mass % to 4.0 mass %.

Examples of a moisture-retentive agent having one or two hydroxyl groups include polyhydric alcohols, typified by ethylene glycol, propylene glycol, diethylene glycol, triethylene glycol, tetraethylene glycol, polyethylene glycol, thiodiethylene glycol, dithiodiglycol and 2-methyl-1,3-propanediol; lower alkyl ethers of polyhydric alcohols, such as ethylene glycol monomethyl (or ethyl) ether, diethylene glycol monomethyl (or ethyl) ether and triethylene glycol monoethyl (or butyl) ether; amines, such as ethanolamine, diethanolamine, N-methyldiethanolamine, N-ethyldiethanolamine, serine and homoserine; and heterocyclic rings such as 2-hydroxyethyl-2-pyrrolidone. Among these compounds, propylene glycol, diethylene glycol, triethylene glycol, tetraethylene glycol, 2-methyl-1,3-propanediol, ethylene glycol monoethyl ether, diethylene glycol monoethyl ether, triethylene glycol monobutyl ether, ethanolamine, diethanolamine, N-methyldiethanolamine and 2-hydroxyethyl-2-pyrrolidone are preferable to the others, and far preferred ones are diethylene glycol, triethylene glycol, tetraethylene glycol, diethylene glycol monoethyl ether, triethylene glycol monobutyl ether, ethanolamine, diethanolamine, N-methyldiethanolamine and 2-hydroxyethyl-2-pyrrolidone.

The content of moisture-retentive agent having one or two hydroxyl groups in an ink composition is preferably from 0.5 mass % to 40 mass %, far preferably from 5 mass % to 30 mass %.

The present ink composition is preferably an ink composition further containing a moisture-retentive agent having 0 to 2 hydroxyl groups, and it is far preferable that the present ink composition contains a moisture-retentive agent having no or one hydroxyl group.

Examples of a moisture-retentive agent having no hydroxyl group include diethylene glycol dimethyl ether, tetraethylene glycol dimethyl ether, amines (such as morpholine, N-ethylmorpholine, ethylenediamine, diethylenetriamine, triethylenetetramine, polyethyleneimine and tetramethylpropylenediamine), polar solvents (such as formamide, N,N-dimethylformamide, N,N-dimethylacetamide, dimethyl sulfoxide, sulfolane, 3-sulfolene, 2-pyrrolidone, N-methyl-2-pyrrolidone, N-vinyl-2-pyrrolidone, 2-oxazolidone and 1,3-dimethyl-2-imidazolidinone), urea derivatives (such as urea, ethyleneurea and thiourea) and carboxylic acid derivatives (such as pyridonecarboxylic acid, lactic acid, citric acid and salts of these acids). Among these compounds, tetraethylene glycol dimethyl ether, morpholine, sulfolane, 2-pyrrolidone, urea and ethyleneurea are preferable to the others, and far preferred ones are 2-pyrrolidone, urea and ethyleneurea. The content of moisture-retentive agents having no hydroxyl group in an ink composition is preferably from 0.5 mass % to 30 mass %, far preferably from 0.5 mass % to 20 mass %.

Another preferred embodiment of the invention is an ink composition which contains a compound represented by the formula (1) and a moisture-retentive agent having 3 or more hydroxyl groups, wherein a molar ratio of the moisture-retentive agent having 3 or more hydroxyl groups to the compound represented by the formula (1) is lower than 30.0, preferably lower than 25.0, far preferably from 0.01 to lower than 25.0, further preferably from 0.01 to lower than 15.0, especially preferably from 0.01 to lower than 10.0.

In addition to the foregoing requirements, it is required for such a preferred embodiment of the invention in particular to be an ink composition in which the content of moisture-retentive agent having 3 or more hydroxyl groups is lower than 25.0 mass %, preferably lower than 20.0 mass %, far preferably from 0.01 mass % to lower than 20.0 mass %, further preferably from 0.01 mass % to lower than 15.0 mass %, especially preferably from 0.01 mass % to lower than lower than 10.0 mass %, of the total content of moisture-retentive agents.

Of those ink compositions, an ink composition containing a moisture-retentive agent having 0 to 2 hydroxyl groups is preferred, and an ink composition containing a moisture-retentive agent having 0 or 1 hydroxyl group is far preferred.

Media which can be added to an ink composition and produce effects different from a moisture-retentive effect are explained below.

Examples of a penetration promoter usable in the invention include alcohol compounds such as ethanol, isopropanol, butanol, di(tri)ethylene glycol monobutyl ether and 1,2-hexanediol, sodium laurylsulfate, sodium oleate and nonionic surfactants. In the invention, penetration promoters of glycol ether type, such as diethylene glycol monobutyl ether and triethylene glycol monobutyl ether, are preferably used. It is preferred that these penetration promoters be used within addition amounts causing neither smearing of prints nor print-through.

However, when a compound used as a penetration promoter in the invention also falls under the category of moisture-retentive agents, the amount of the compound added is counted as the amount of one of moisture-retentive agents added, and thereto the quantitative restrictions on the moisture-retentive agents are therefore applied.

Examples of a ultraviolet absorber usable for the purpose of improving the keeping quality of images in the invention include the benzotriazole compounds as disclosed in JP-A-58-185677, JP-A-61-190537, JP-A-2-782, JP-A-5-197075, and JP-A-9-34057, the benzophenone compounds as disclosed in JP-A-46-2784, JP-A-5-194483 and U.S. Pat. No. 3,214,463, the cinnamic acid compounds as disclosed in JP-B-48-30492, JP-B-56-21141, JP-A-10-88106, the triazine compounds as disclosed in JP-A-4-298503, JP-A-8-53427, JP-A-8-239368, JP-A-10-182621, and JP-T-8-501291 (the term "JP-T" as used herein means a published Japanese translation of a PCT patent application), and compounds producing fluorescence through the absorption of ultraviolet rays, typified by the compounds disclosed in *Research Disclosure*, No. 24239, stilbene compounds and benzoxazole compounds, or the so-called fluorescent whitening agents. These compounds are preferably used in an amount lower than 5 mass %. However, when a compound used as an ultraviolet absorber in the invention also falls under the category of moisture-retentive agents, the amount of the compound added is counted as the amount of one of moisture-retentive agents added, and thereto the quantitative restrictions on the moisture-retentive agents are therefore applied.

As antioxidants used for the purpose of improving the keeping quality of images, various discoloration inhibitors of organic or metal-complex type can be used in the invention. Examples of a discoloration inhibitor of organic type include hydroquinones, alkoxyphenols, dialkoxyphenols, phenols, anilines, amines, indans, chromans, alkoxyanilines and heterocyclic rings, and examples of a discoloration inhibitor of metal-complex type include nickel complexes and zinc complexes. More specifically, it is possible to use as the antioxidants the compounds disclosed in the patent documents to which references are made in *Research Disclosure*, No. 17643, item VII-I or VII-J, ibid., No. 15162, ibid., No. 18716, p. 650, left column, ibid., No. 36544, p. 527, ibid., No. 307105, p. 872 and ibid., No. 15162, and the compounds included in the formula of representative compounds and compound examples illustrated in JP-A-62-215272, pp. 127-137. These compounds are preferably used in an amount lower than 5 mass %. However, when a compound used as an antioxidant in the invention also falls under the category of moisture-retentive agents, the amount of the compound added is counted as the amount of one of moisture-retentive agents added, and thereto the quantitative restrictions on the moisture-retentive agents are therefore applied.

Antifoaming agents usable in the invention are copolymers of dimethylpolysiloxane and polyalkylene oxides. These copolymers are of three types: a pendant type, an end-modified type and an ABN type. Of these types, a pendant type is preferable to the others. Examples of such copolymers include FZ-2203, FZ-2207, FZ-2222 and FZ-2166 (trade names, products of Nippon Unicar Company Limited). They are preferably used in an amount lower than 5 mass %. However, when a compound used as an antifoaming agent in the invention also falls under the category of moisture-retentive agents, the amount of the compound added is counted as the amount of one of moisture-retentive agents added, and thereto the quantitative restrictions on the moisture-retentive agents are therefore applied.

Examples of an antifungal agent usable in the invention include sodium dehydroacetate, sodium benzoate, sodium pyridinethione-1-oxide, ethyl ester p-hydroxybenzoate, and 1,2-benzisothiazoline-3-one and salts thereof. These compounds are preferably used in ink in an amount of 0.02 mass % to 5.00 mass %.

Incidentally, details of these antifungal agents are described e.g. in *Bokin Bobaizai Jiten* (edited by the encyclopedia editing committee of The Society of Antibacterial and Antifungal Agents, Japan).

In addition, examples of a rust inhibitor include acid sulfites, sodium thiosulfate, ammonium thioglycolate, diisopropylammonium nitrite, pentaerythritol tetranitrate, dicyclohexylammonium nitrite and benzotriazole. These compounds are preferably used in ink in an amount of 0.02 mass % to 5.00 mass %.

The use of a pH adjuster in the invention is favorable for adjustment of pH, impartment of dispersion stability and so on, and the ink is adjusted to a pH 8-11, preferably a pH 7-9, at 23° C. When the pH is lower than 8, the solubility of a compound of the formula (1) is depressed and clogging of nozzles tends to occur; while, when the pH is greater than 11, the water resistance tends to deteriorate. Examples of a basic pH adjuster include an organic base and an inorganic alkali, and examples of an acidic pH adjuster include an organic acid and an inorganic acid.

Examples of the organic base include triethanolamine, diethanolamine, N-methyldiethanolamine and dimethylethanolamine. Of these amines, diethanolamine, N-methyldiethanolamine and dimethylethanolamine are preferred, and N-methyldiethanolamine and dimethylethanolamine are far preferred. Examples of the inorganic alkali include hydroxides of alkali metals (such as sodium hydroxide, lithium hydroxide and potassium hydroxide), carbonates (such as sodium carbonate and sodium hydrogen carbonate) and ammonium. And examples of the organic acid include acetic acid, propionic acid, trifluoroacetic acid and an alkylsulfonic acid. Examples of the inorganic acid include hydrochloric acid, sulfuric acid and phosphoric acid. When a compound used as a pH adjuster in the invention also falls under the category of moisture-retentive agents, the amount of the compound added is counted as the amount of one of moisture-retentive agents added, and thereto the quantitative restrictions on the moisture-retentive agents are therefore applied. Additionally, since triethanolamine fits into the category of moisture-retentive agents having 3 or more hydroxyl groups per each, and thereto the restrictions on the addition amount are applied.

As surface tension adjusters or the like, nonionic, cationic and anionic surfactants are usable in the invention. Examples of an anionic surfactant include a fatty acid salt, an alkylsulfuric ester salt, an alkylbenzene sulfonate, an alkylnaphthalene sulfonate, a dialkylsulfosuccinate, an alkylphosphoric ester salt, a naphthalenesulfonic acid-formaldehyde condensate, and a polyoxyethylene alkylsulfuric ester salt. Examples of a nonionic surfactant include a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkylamine, a glycerin fatty acid ester, and an oxyethylene-oxypropylene block copolymer. These surfactants are preferably used in an amount lower than 5 mass %. However, when a compound used as a surface tension adjuster or the like in the invention also falls under the category of moisture-retentive agents, the amount of the compound added is counted as the amount of one of moisture-retentive agents added, and thereto the quantitative restrictions on the moisture-retentive agents are therefore applied.

In the invention, surfactants of an acetylene glycol type (preferably an acetylene-series polyoxyethylene oxide type) are preferably used, and examples thereof include SURFYNOLS (e.g. SURFYNOL 465, a product of Air Products & Chemicals, Inc.). The content of surfactants is from 0.001 mass % to 15 mass %, preferably from 0.005 mass % to 10 mass %, far preferably from 0.01 mass % to 5 mass %, particularly preferably from 0.1 mass % to 5 mass %, with respect to the total amount of the ink composition.

The surface tension of ink used in the invention, regardless of whether dynamic or static, is preferably from 20 mN/m to 50 mN/m, far preferably from 20 mN/m to 40 mN/m, at 25° C. When the surface tension of ink is higher than 50 mN/m, discharge stability and printing qualities about occurrence of blurring at the time of mixing of colors, feathering and the like deteriorate seriously. On the other hand, when the surface tension of ink is reduced to 20 mN/m or below, there may be cases where print defects are caused by adhesion of the ink to the surface of hardware during the ink discharge.

The ink viscosity in the invention is preferably from 1 mPa·s to 30 mPa·s at 25° C. And it is far preferably from 2 mPa·s to 15 mPa·s, particularly preferably from 2 mPa·s to 10 mPa·s, at 25° C. When the ink viscosity is higher than 30 mPa·s, not only the fixing speed of recorded images is reduced, but also discharge performance is lowered. When the ink viscosity is lower than 1 mPa·s, the images recorded are poor in quality because they become blurred.

The viscosity adjustment can be made arbitrarily by controlling the amount of an ink solvent added. Examples of an ink solvent include glycerin, diethylene glycol, propylene glycol, triethanolamine, 2-pyrrolidone, diethylene glycol monobutyl ether and triethylene glycol monobutyl ether. Of these solvents, diethylene glycol, propylene glycol, 2-pyrrolidone, diethylene glycol monobutyl ether and triethylene glycol monobutyl ether are preferable to the others, and diethylene glycol, 2-pyrrolidone and triethylene glycol monobutyl ether are far preferred. Since glycerin is a moisture-retentive agent having 3 hydroxyl groups, thereto the quantitative restrictions specified above are applied.

Alternatively, a viscosity adjuster may be used. Examples of the viscosity adjuster include cellulose, water-soluble polymers such as polyvinyl alcohol, and nonionic surfactants. Further details of viscosity adjusters are given in *Nendo Chosei Gijutsu*, chap. 9 (published by TECHNICAL INFORMATION INSTITUTE CO., LTD. in 1999) and *Inkujetto Purinta yo Kemikaruzu (98 Zoho)—Zairyo no Kaihatsu Doko-Tenkai Chosa*—, pp. 162-174 (published by CMC Publishing Co., Ltd. in 1997). These are preferably used in an amount lower than 5 mass %. When a compound used as viscosity adjuster in the invention also falls under the category of moisture-retentive agents, the amount of the compound added is counted as the amount of one of moisture-retentive agents added, and thereto the quantitative restrictions on the moisture-retentive agents are therefore applied.

The present ink is preferably used as yellow ink. And the present ink can be used for not only image formation in yellow monochrome but also full-color image formation. For formation of full-color images, magenta ink and cyan ink can be used in addition to yellow ink, and for hue conditioning, black ink may further be used. Alternatively, the present ink may be used for hue conditioning of black ink or so on.

As to magenta ink which can be used within the scope of enjoyment of effects produced by a recording method according to the invention, examples of its coupler component include aryl- or heterylazo dyes having phenols, naphthols, anilines or the like, azomethine dyes having pyrazolones, pyrazolotriazoles or the like, methine dyes such as arylidene dyes, styryl dyes, merocyanine dyes, cyanine dyes or oxonol dyes, carbonium dyes such as diphenylmethane dyes, triphenylmethane dyes or xanthene dyes, quinone dyes such as naphthoquinone, anthraquinone and anthrapyridone, and condensed polycyclic dyes such as dioxazine dyes.

As to cyan ink which can be used within the scope of enjoyment of effects produced by a recording method according to the invention, examples of its coupler component include aryl- or heterylazo dyes having phenols, naphthols, anilines or the like, azomethine dyes having phenols, naphthols, heterocyclic rings such as pyrrolotriazole, or the like, polymethine dyes such as cyanine dyes, oxonol dyes, merocyanine dyes or the like, carbonium dyes such as diphenylmethane dyes, triphenylmethane dyes or xanthene dyes, phthalocyanine dyes, anthraquinone dyes, and indigo•thioindigo dyes.

Examples of an applicable black material include disazo dyes, trisazo dyes, tetraazo dyes, and disperse systems of carbon black.

The present ink set is an ink set used for an inkjet recording method, and contains the present ink composition as a constituent. The present yellow ink composition is accommodated in an ink cartridge independently of or integrally with ink compositions of colors other than yellow, such as a magenta ink composition, a cyan ink composition and black ink composition. The present ink set can be designed to have the form of an ink cartridge by using a hitherto known method as appropriate, except for accommodation of the present yellow ink composition.

<Ink Recording Method>

Next the present recording method using the ink compositions is explained. The recording in the present ink is made on a recording medium. By giving energy to the inkjet recording ink, images are formed on known image receiving materials as recording media, more specifically including plain paper, resin-coated paper, inkjet-specific paper as disclosed e.g. in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotograph sharing paper, textile, glass, metal, ceramics and so on. Additionally, descriptions in JP-A-2003-306623, paragraphs 0093 to 0105 can be applied to the present inkjet recording method.

When images are formed, a polymer latex compound may be used simultaneously for the purposes of imparting glossiness and water resistance to the images and improving weather resistance of the images. The timing of addition of the latex compound to an image receiving material may be before or after or at the same time as addition of a coloring agent, and therefore the location for the addition may be the interior of an image receiving paper or ink, or the polymer latex in a liquid state may be used by itself.

To be more specific, the methods disclosed in JP-A-2002-166638, JP-A-2002-121440, JP-A-2002-154201, JP-A-2002-144696, JP-A-2002-080759, JP-A-2002-187342 and JP-A-2002-172774 can be preferably used.

Recording media (recording paper and recording film) used for inkjet printing with the present ink are explained below. Those which are usable as substrates in recording paper and recording film are paper made by preparing chemical pulp such as LBKP or NBKP, mechanical pulp such as GP, PGW, RMP, TMP, CTMP, CMP or CGP, waste paper pulp such as DIP, or so on, mixing in the pulp hitherto known additives, such as a pigment, a binder, a sizing agent, a fixing agent, a cationic agent and a paper strengthening agent, on an as needed basis, and putting the mixture through a paper machine such as a fourdrinier machine or a cylinder machine. In addition to such substrates, any of synthetic paper and plastic film sheets may be used. Each substrate is preferably from 10 µm to 250 µm in thickness and from 10 g/m$^2$ to 250 g/m$^2$ in basis weight.

Such a substrate may be provided with an ink receiving layer and a backing coat layer as it is, or it may be provided with an ink receiving layer and a backing coat layer after it undergoes sizepress coating with starch, polyvinyl alcohol or the like or anchor coating. Further, the substrate may be subjected to flattening treatment by means of calendering apparatus, such as a machine calender, a TG calender or a soft calender. In the invention, paper which is laminated with polyolefin (e.g. polyethylene, polystyrene, polyethylene terephthalate, polybutene or a copolymer thereof) on either side thereof, or plastic film is preferably used as the substrate. And it is preferred that a white pigment (such as titanium oxide or zinc oxide) or a tinting dye (such as cobalt blue, ultramarine blue or neodymium oxide) be added to the polyolefin.

In the ink receiving layer provided on the substrate, a pigment and an aqueous binder are incorporated. The pigment is preferably a white pigment, and examples thereof include white inorganic pigments such as calcium carbonate, kaolin, talc, clay, diatomaceous silica, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as a styrene pigment, an acrylic pigment, urea resin and melamine resin. As white pigments which can be incorporated in the ink receiving layer, porous inorganic pigments are preferred, and synthetic amorphous silica having a great pore area is most suitable. As the synthetic amorphous silica, both silicic acid anhydride obtained by a dry manufacturing method and hydrous silicic acid obtained by a wet manufacturing method are usable, and the use of hydrous silicic acid in particular is preferred.

An inkjet recording method according to the invention has no restrictions on the recording system of ink jets, and it can be used in known systems, including an electric charge controlling system of discharging ink by utilizing electrostatically induced force, a drop-on-demand system (pressure pulse system) of using an inkjet head forming ink droplets through mechanical deformation of electrostriction elements and utilizing vibration pressure of piezoelectric elements, an acoustic inkjet system of converting electric signals to acoustic beams, irradiating ink with the acoustic beams and discharging the ink by utilizing the radiation pressure, a thermal inkjet system of forming air bubbles by heating ink and utilizing the thus generated pressure, and so on. In inkjet recording systems are included a system of ejecting many small-volume drops of low-concentration ink referred to as photo ink, a system of improving image quality by using two or more varieties of ink having substantially the same hue as but differing in concentration from each other, and a system of using colorless, transparent ink. The present inkjet recording method prefers to produce records by discharging droplets of an ink composition and making the droplets adhere to a recording medium. Although the present recording method can be used suitably for inkjet recording systems in particular, needless to say, its applications can also be for ordinary writing implements, recorders, pen plotters and so on. Additionally, recorded matter according to the invention is what is printed by the inkjet recording method.

EXAMPLES

The invention is illustrated below by examples, but these examples should not be construed as limiting the scope of the invention.

To the ingredients mentioned below, ultra-pure water (18 MΩ or higher in resistance) was added in an amount that the mixture obtained reached a volume of 1 liter, and stirred for 1 hour under heating at a temperature in a range of 30° C. to 40° C. Thereafter, the solution obtained was filtered through a microfilter having an average pore size of 0.25 µm under reduced pressure, thereby preparing an ink solution 1. To this ink solution 1, ultra-pure water was added to make the mass of the resulting solution 1,000 g, thereby preparing Ink 1. In this Ink 1, the molar ratio of the moisture-retentive agents having 3 or more hydroxyl groups per molecule to the compound represented by the formula (1) is 9.42 and the content of moisture-retentive agents having 3 or more hydroxyl groups per molecule is 14.7 mass % with respect to all the moisture-retentive agents.

<Ink 1 Formula>

| | |
|---|---|
| Compound 1 | 65 g/l |
| Compound (2-1) | 50 g/l |
| Urea | 10 g/l |
| Triethylene glycol | 90 g/l |
| Glycerin | 1.2 g/l |
| Triethylene glycol monobutyl ether | 90 g/l |
| 2-Pyrrolidone | 50 g/l |
| Triethanolamine | 7 g/l |
| Surfynol 465 (manufactured by Nissin Chemical Industry Co., Ltd.) | 10 g/l |
| Proxel XL2 (manufactured by Fujifilm Imaging Colorants Ltd.) | 5 g/l |

<Preparation of Ink 2 to Ink 61>

Ink 2 to Ink 61 were prepared according to the same formula as Ink 1 was prepared, except that the compounds, the additives and the amounts thereof were changed as those shown in Tables 1 to 3, respectively.A

TABLE 1

| g/l | Ink 2 | Ink 3 | Ink 4 | Ink 5 | Ink 6 | Ink 7 | Ink 8 | Ink 9 | Ink 10 | Ink 11 | Ink 12 | Ink 13 | Ink 14 | Ink 15 | Ink 16 | Ink 17 | Ink 18 |
|---|---|---|---|---|---|---|---|---|---|---|---|---|---|---|---|---|---|
| Compound 1 | 60 | 50 | 40 | 40 | | | | | | 30 | 20 | 10 | | | | | |
| Compound 4 | | | | | 40 | | | | | | | | 40 | | | | |
| Compound 7 | | | | | | 40 | | | | | | | | | | | |
| Compound 17 | | | | | | | 40 | | | | | | | | 40 | 40 | 40 | 40 |
| Compound 21 | | | | | | | | 40 | | | | | | | | | |
| Compound 25 | | | | | | | | | 40 | | | | | | | | |
| Compound (2-1) | 5 | | 5 | | | | | | | | | | | 5 | | | |
| Compound (2-2) | | 5 | | 5 | 5 | 5 | 5 | 5 | 5 | | | | | | | | |
| Compound (3) | | | | | | | | | | 15 | 25 | 35 | 5 | | | | |
| Compound (4) | | | | | | | | | | | | | | | 5 | | |
| Compound (5) | | | | | | | | | | | | | | | | 5 | |
| Compound (6) | | | | | | | | | | | | | | | | | 5 |
| Glycerin | 50 | 45 | 35 | 20 | 40 | 34 | 30 | 35 | 50 | 25 | 15 | 0 | 35 | 35 | 35 | 30 | 35 |
| Tetraethylene glycol | 90 | 40 | 90 | 40 | 90 | | | | | | | | | | | | |
| Triethylene glycol | 25 | 20 | 35 | 30 | 30 | 90 | 90 | 90 | 90 | 40 | 40 | 45 | 40 | 90 | 40 | 40 | 40 |
| Propylene glycol | | | | | | 36 | 40 | 35 | 20 | | | | | | | | |
| Diethylene glycol | | | | | | | | | | 30 | 35 | 40 | 15 | 55 | 15 | 20 | 15 |
| 1,2-Hexanediol | | | | | | | | | | 30 | 30 | 30 | 30 | 30 | 30 | 30 | 30 |
| TEGmBE (*1) | 80 | 90 | 90 | 90 | 90 | 90 | 90 | 90 | 90 | 90 | 90 | 90 | 90 | 90 | 90 | 90 | 90 |
| DEGmBE (*1) | 20 | 75 | 20 | 75 | 20 | 20 | 20 | 20 | 20 | 85 | 90 | 90 | 90 | | 90 | 90 | 90 |
| Olfine E1010 (*2) | | 10 | | 10 | | | | | | 10 | 10 | 10 | 10 | | 10 | 10 | 10 |
| Olfine PD001 (*2) | | | | | | | | 10 | 10 | | | | | | | | |
| Surfynol 465 (*2) | 10 | 10 | 10 | 10 | 10 | 10 | 10 | 10 | 10 | 10 | 10 | 10 | 10 | 10 | 10 | 10 | 10 |
| 2-Pyrrolidone | 50 | 50 | 50 | 50 | 50 | 50 | 50 | 50 | 50 | 50 | 50 | 50 | 50 | 50 | 50 | 50 | 50 |
| Urea | | | | | | | | | | | | | | | | | |
| Ethyleneurea | 20 | 20 | 20 | | 25 | 10 | 10 | 25 | 25 | 20 | 20 | 20 | 25 | 10 | 20 | 20 | 20 |
| Trimethylolpropane | | | | 20 | | | | | | 5 | 5 | 5 | 5 | 5 | 5 | 5 | 5 |
| Triethanolamine | | | | | | | | | | 1 | 1 | 1 | | | | | |
| Diethanolamine | 8 | 5 | 4 | 4 | 4 | 4 | 4 | 4 | 4 | 5 | 5 | 5 | 5 | 5 | 4 | 4 | 4 |
| Proxel XL2 (*3) | 5 | 5 | 5 | 5 | 5 | 5 | 5 | 5 | 5 | 5 | 5 | 5 | 5 | 5 | 5 | 5 | 5 |
| Weight % (*4) | 5.0 | 4.5 | 3.5 | 4.0 | 4.0 | 3.4 | 3.0 | 3.5 | 5.0 | 3.1 | 2.1 | 0.6 | 4.0 | 4.0 | 4.0 | 3.5 | 4.0 |
| Molar ratio | 10.21 | 11.03 | 10.72 | 10.33 | 12.25 | 10.16 | 11.60 | 11.65 | 11.59 | 11.86 | 11.67 | 4.96 | 11.77 | 14.86 | 14.86 | 12.93 | 14.86 |
| Weight % (*5) | 14.6 | 13.0 | 10.2 | 12.2 | 11.5 | 10.2 | 9.0 | 10.0 | 14.3 | 8.1 | 5.5 | 1.6 | 10.4 | 10.8 | 10.6 | 9.2 | 10.6 |

(*1) TEGmBE: Triethylene glycol monobutyl ether, DEGmBE: Diethylene glycol monobutyl ether,
(*2) A product of Nissin Chemical Industry Co., Ltd.,
(*3) A product of Fujifilm Imaging Colorants Ltd.,
(*4) Content by mass % of moisture-retentive agents having 3 or more hydroxyl groups per molecule with respect to the total amount of each ink, and
(*5) Content by mass % of moisture-retentive agents having 3 or more hydroxyl groups per molecule with respect to the total amount of all the moisture-retentive agents in each ink.

TABLE 2

| g/l | Ink 19 | Ink 20 | Ink 21 | Ink 22 | Ink 23 | Ink 24 | Ink 25 | Ink 26 | Ink 27 |
|---|---|---|---|---|---|---|---|---|---|
| Compound 1 | 40 | 40 | 40 | 40 | 40 | 40 | 40 | 40 | 40 |
| Compound 4 | | | | | | | | | |
| Compound 7 | | | | | | | | | |
| Compound 17 | | | | | | | | | |
| Compound 21 | | | | | | | | | |
| Compound 25 | | | | | | | | | |
| Compound (2-1) | 5 | | 5 | | | | | | |
| Compound (2-2) | | 5 | | 5 | 5 | 5 | 5 | 5 | 5 |
| Compound (3) | | | | | | | | | |
| Compound (4) | | | | | | | | | |
| Compound (5) | | | | | | | | | |
| Compound (6) | | | | | | | | | |
| Glycerin | | 40 | 60 | 70 | 80 | 90 | 100 | 110 | 120 |
| Tetraethylene glycol | | | | | | | | | |
| Triethylene glycol | 90 | 90 | 90 | 90 | 90 | 90 | 90 | 90 | 90 |
| Propylene glycol | | | | | | | | | |
| Diethylene glycol | 90 | 90 | 90 | 90 | 90 | 90 | 90 | 90 | 90 |
| 1,2-Hexanediol | | | | | | | | | |
| TEGmBE (*1) | 80 | 80 | 80 | 80 | 80 | 80 | 80 | 80 | 80 |
| DEGmBE (*1) | 20 | 20 | 20 | 20 | 20 | 20 | 20 | 20 | 20 |
| Olfine E1010 (*2) | | | | | | | | | |
| Olfine PD001 (*2) | | | | | | | | | |
| Surfynol 465 (*2) | 10 | 10 | 10 | 10 | 10 | 10 | 10 | 10 | 10 |
| 2-Pyrrolidone | 50 | 50 | 50 | 50 | 50 | 50 | 50 | 50 | 50 |
| Urea | | | | | | | | | |
| Ethyleneurea | 20 | 20 | 20 | 20 | 20 | 20 | 20 | 20 | 20 |
| Trimethylolpropane | | | | | | | | | |
| Triethanolamine | | | | | | | | | |
| Diethanolamine | 5 | 4 | 4 | 4 | 4 | 4 | 4 | 4 | 4 |
| Proxel XL2 (*3) | 5 | 5 | 5 | 5 | 5 | 5 | 5 | 5 | 5 |

TABLE 2-continued

| | | | | | | | | | |
|---|---|---|---|---|---|---|---|---|---|
| Weight % (*4) | 0.0 | 4.0 | 6.0 | 7.0 | 8.0 | 9.0 | 10.0 | 11.0 | 12.0 |
| Molar ratio | 0.00 | 12.25 | 18.38 | 21.44 | 24.50 | 27.57 | 30.63 | 33.69 | 36.76 |
| Weight % (*5) | 0.0 | 10.2 | 14.5 | 16.5 | 18.4 | 20.3 | 22.0 | 23.7 | 25.3 |

| g/l | Ink 28 | Ink 29 | Ink 30 | Ink 32 | Ink 32 | Ink 33 | Ink 34 | Ink 35 | Ink 36 |
|---|---|---|---|---|---|---|---|---|---|
| Compound 1 | | | | | | | | | |
| Compound 4 | | | | | | | | | |
| Compound 7 | 40 | 40 | 40 | 40 | 40 | 40 | 40 | 40 | 40 |
| Compound 17 | | | | | | | | | |
| Compound 21 | | | | | | | | | |
| Compound 25 | | | | | | | | | |
| Compound (2-1) | | | | | | | | | |
| Compound (2-2) | 5 | 5 | 5 | 5 | 5 | 5 | 5 | 5 | 5 |
| Compound (3) | | | | | | | | | |
| Compound (4) | | | | | | | | | |
| Compound (5) | | | | | | | | | |
| Compound (6) | | | | | | | | | |
| Glycerin | | 40 | 60 | 70 | 80 | 90 | 100 | 110 | 120 |
| Tetraethylene glycol | | | | | | | | | |
| Triethylene glycol | 90 | 90 | 90 | 90 | 90 | 90 | 90 | 90 | 90 |
| Propylene glycol | | | | | | | | | |
| Diethylene glycol | 90 | 90 | 90 | 90 | 90 | 90 | 90 | 90 | 90 |
| 1,2-Hexanediol | | | | | | | | | |
| TEGmBE (*1) | 80 | 80 | 80 | 80 | 80 | 80 | 80 | 80 | 80 |
| DEGmBE (*1) | 20 | 20 | 20 | 20 | 20 | 20 | 20 | 20 | 20 |
| Olfine E1010 (*2) | | | | | | | | | |
| Olfine PD001 (*2) | | | | | | | | | |
| Surfynol 465 (*2) | 10 | 10 | 10 | 10 | 10 | 10 | 10 | 10 | 10 |
| 2-Pyrrolidone | 50 | 50 | 50 | 50 | 50 | 50 | 50 | 50 | 50 |
| Urea | | | | | | | | | |
| Ethyleneurea | 20 | 20 | 20 | 20 | 20 | 20 | 20 | 20 | 20 |
| Trimethylolpropane | | | | | | | | | |
| Triethanolamine | | | | | | | | | |
| Diethanolamine | 4 | 4 | 4 | 4 | 4 | 4 | 4 | 4 | 4 |
| Proxel XL2 (*3) | 5 | 5 | 5 | 5 | 5 | 5 | 5 | 5 | 5 |
| Weight % (*4) | 0.0 | 4.0 | 6.0 | 7.0 | 8.0 | 9.0 | 10.0 | 11.0 | 12.0 |
| Molar ratio | 0.00 | 11.95 | 17.92 | 20.91 | 23.89 | 26.88 | 29.87 | 32.86 | 35.84 |
| Weight % (*5) | 0.0 | 10.2 | 14.5 | 16.5 | 18.4 | 20.3 | 22.0 | 23.7 | 25.3 |

(*1) TEGmBE: Triethylene glycol monobutyl ether, DEGmBE: Diethylene glycol monobutyl ether,
(*2) A product of Nissin Chemical Industry Co., Ltd.,
(*3) A product of Fujifilm Imaging Colorants Ltd.,
(*4) Content by mass % of moisture-retentive agents having 3 or more hydroxyl groups per molecule with respect to the total amount of each ink, and
(*5) Content by mass % of moisture-retentive agents having 3 or more hydroxyl groups per molecule with respect to the total amount of all the moisture-retentive agents in each ink.

TABLE 3

| g/l | Ink 37 | Ink 38 | Ink 39 | Ink 40 | Ink 41 | Ink 42 | Ink 43 | Ink 44 | Ink 45 | Ink 46 | Ink 47 | Ink 48 |
|---|---|---|---|---|---|---|---|---|---|---|---|---|
| Compound 1 | 60 | 45 | 40 | 40 | | 40 | | 40 | 40 | 40 | 40 | 15 |
| Compound 17 | | | | | 40 | | 40 | | | | | 25 |
| Compound (2-1) | | | | | | | | 5 | | | | |
| Compound (2-2) | 5 | 5 | 5 | | | 5 | 5 | | 5 | | | 5 |
| Compound (3) | | | | 5 | 5 | | | | | 5 | 5 | |
| Compound (4) | | | | | | | | | | | | |
| Compound (5) | | | | | | | | | | | | |
| Compound (6) | | | | | | | | | | | | |
| Glycerin | 65 | 60 | 55 | 80 | 80 | 80 | 80 | 40 | 40 | 80 | 80 | 25 |
| Tetraethylene glycol | | | | | | | | 80 | 80 | 40 | 40 | 40 |
| Triethylene glycol | 90 | 90 | 90 | 40 | 40 | 40 | 40 | | | | | 40 |
| Propylene glycol | 5 | 20 | 20 | 40 | 40 | 40 | 40 | | | 40 | 40 | 40 |
| Diethylene glycol | | | | | 10 | | 10 | | | | | |
| 1,2-Hexanediol | 10 | 10 | | | | | | | | | | |
| TEGmBE (*1) | 90 | 90 | 90 | 90 | 90 | 90 | 90 | 70 | 70 | 90 | 90 | 90 |
| DEGmBE (*1) | 20 | 20 | 20 | 20 | 20 | 20 | 20 | | | 20 | 20 | 20 |
| Olfine E1010 (*2) | | 10 | | 10 | 10 | | | | | | | |
| Olfine PD001 (*2) | | | | | | 10 | 10 | | | | | |
| Surfynol 465 (*2) | 10 | 10 | 10 | 10 | 10 | 10 | 10 | 10 | 10 | 10 | 10 | 10 |
| 2-Pyrrolidone | 50 | 50 | 50 | 50 | 50 | 50 | 50 | 20 | 20 | 50 | 50 | 50 |
| Urea | | | | | | | | 20 | 20 | | | |
| Ethyleneurea | 25 | 20 | 10 | 20 | 20 | 20 | 20 | | | 20 | 20 | 20 |
| Trimethylol propane | | 1 | | | | | | | | | | |
| Triethanolamine | 1 | | 1 | | | | | | | | | |
| Diethanolamine | 7 | 4 | 4 | 4 | 4 | 4 | 4 | 5 | 5 | 4 | 4 | 4 |
| Proxel XL2 (*3) | 5 | 5 | 5 | 5 | 5 | 5 | 5 | 5 | 5 | 5 | 5 | 5 |
| Weight % (*4) | 6.6 | 6.1 | 5.6 | 8.0 | 8.0 | 8.0 | 8.0 | 4.0 | 4.0 | 8.0 | 8.0 | 2.5 |

TABLE 3-continued

| Molar ratio | 13.40 | 16.52 | 17.04 | 24.50 | 30.94 | 24.50 | 30.94 | 12.25 | 12.25 | 24.50 | 24.50 | 8.80 |
|---|---|---|---|---|---|---|---|---|---|---|---|---|
| Weight % (*5) | 18.18 | 16.71 | 16.47 | 23.26 | 22.60 | 23.26 | 22.60 | 17.02 | 17.02 | 23.26 | 23.26 | 7.60 |

| g/l | Ink 49 | Ink 50 | Ink 51 | Ink 52 | Ink 53 | Ink 54 | Ink 55 | Ink 56 | Ink 57 | Ink 58 | Ink 59 | Ink 60 | Ink 61 |
|---|---|---|---|---|---|---|---|---|---|---|---|---|---|
| Compound 1 | 20 | 25 | 20 | 20 | 30 | 20 | 10 | 40 | 40 | 40 | 40 | 40 | 40 |
| Compound 17 | 20 | 15 | 20 | 20 | | | | | | | | | |
| Compound (2-1) | | | | | | | | 5 | | | | | |
| Compound (2-2) | 5 | 5 | 5 | 5 | | | | | 5 | | | | |
| Compound (3) | | | | | 15 | 25 | 35 | | | 5 | | | |
| Compound (4) | | | | | | | | | | | 5 | | |
| Compound (5) | | | | | | | | | | | | 5 | |
| Compound (6) | | | | | | | | | | | | | 5 |
| Glycerin | 25 | 35 | 50 | 50 | 70 | 70 | 70 | 105 | 105 | 105 | 105 | 105 | 105 |
| Tetraethylene glycol | 40 | 40 | 40 | 40 | | | | | | | | | |
| Triethylene glycol | 40 | 40 | 40 | 40 | 50 | 50 | 50 | 90 | 90 | 90 | 90 | 90 | 90 |
| Propylene glycol | 40 | 40 | 40 | 40 | 30 | 30 | 30 | | | | | | |
| Diethylene glycol | | | | | | | | 90 | 90 | 90 | 90 | 90 | 90 |
| 1,2-Hexanediol | | | | | | | | | | | | | |
| TEGmBE (*1) | 90 | 90 | 90 | 90 | 90 | 90 | 90 | 70 | 70 | 70 | 70 | 70 | 70 |
| DEGmBE (*1) | 20 | 20 | 20 | 20 | 20 | 20 | 20 | | | | | | |
| Olfine E1010 (*2) | | | | | | | | | | | | | |
| Olfine PD001 (*2) | | | | | | | | | | | | | |
| Surfynol 465 (*2) | 10 | 10 | 10 | 10 | 10 | 10 | 10 | 10 | 10 | 10 | 10 | 10 | 10 |
| 2-Pyrrolidone | 50 | 50 | 50 | 50 | 50 | 50 | 50 | 20 | 20 | 20 | 20 | 20 | 20 |
| Urea | | | | | | | | 20 | 20 | 20 | 20 | 20 | 20 |
| Ethyleneurea | 20 | 20 | 20 | 20 | 20 | 20 | 20 | | | | | | |
| Trimethylol propane | | | | | 10 | 10 | 10 | | | | | | |
| Triethanolamine | | | | | | | | | | | | | |
| Diethanolamine | 4 | 4 | 5 | 5 | 5 | 4 | 3 | 5 | 5 | 5 | 5 | 5 | 5 |
| Proxel XL2 (*3) | 5 | 5 | 5 | 5 | 5 | 5 | 5 | 5 | 5 | 5 | 5 | 5 | 5 |
| Weight % (*4) | 2.5 | 3.5 | 5.0 | 5.0 | 8.0 | 8.0 | 8.0 | 1.05 | 10.5 | 10.5 | 10.5 | 10.5 | 10.5 |
| Molar ratio | 8.55 | 11.63 | 17.09 | 17.09 | 28.84 | 43.30 | 86.52 | 32.16 | 32.16 | 32.16 | 32.16 | 32.16 | 32.16 |
| Weight % (*5) | 7.60 | 10.32 | 14.08 | 14.08 | 23.19 | 23.26 | 23.32 | 26.25 | 26.25 | 26.25 | 26.25 | 26.25 | 26.25 |

(*1) TEGmBE: Triethylene glycol monobutyl ether, DEGmBE: Diethylene glycol monobutyl ether,
(*2) A product of Nissin Chemical Industry Co., Ltd.,
(*3) A product of Fujifilm Imaging Colorants Ltd.,
(*4) Content by mass % of moisture-retentive agents having 3 or more hydroxyl groups per molecule with respect to the total amount of each ink, and
(*5) Content by mass % of moisture-retentive agents having 3 or more hydroxyl groups per molecule with respect to the total amount of all the moisture-retentive agents in each ink.

In the tables, the term "Molar ratio" refers to the molar ratio of the moisture-retentive agents having 3 or more hydroxyl groups per molecule to the compound represented by the formula (1).

The structural formulae of Compounds (2-1) to Compound (6) used for mixing with the color materials are illustrated below.

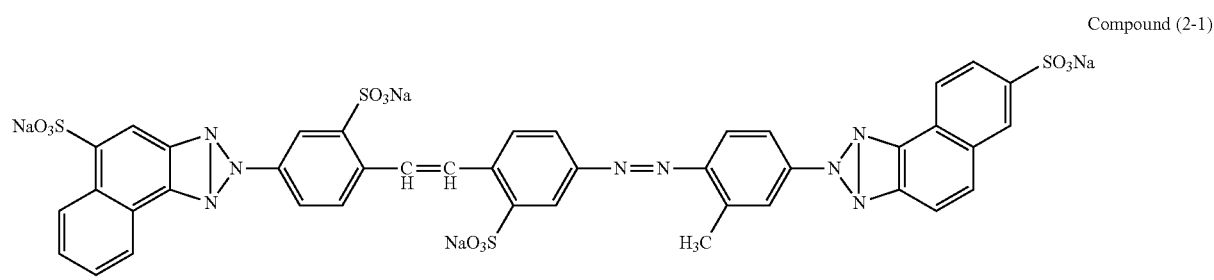

Compound (2-1)

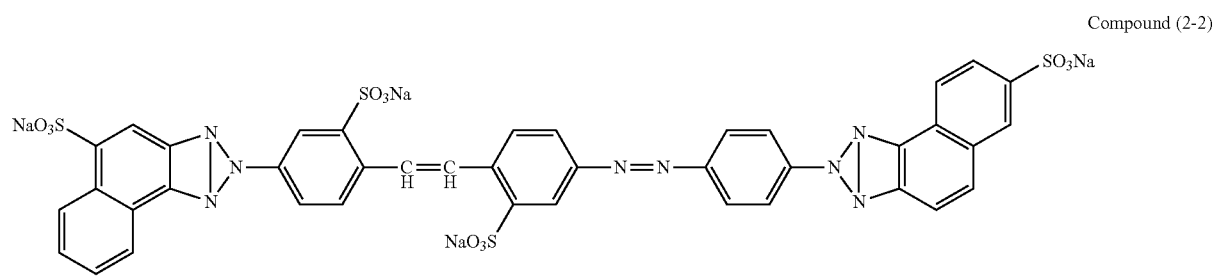

Compound (2-2)

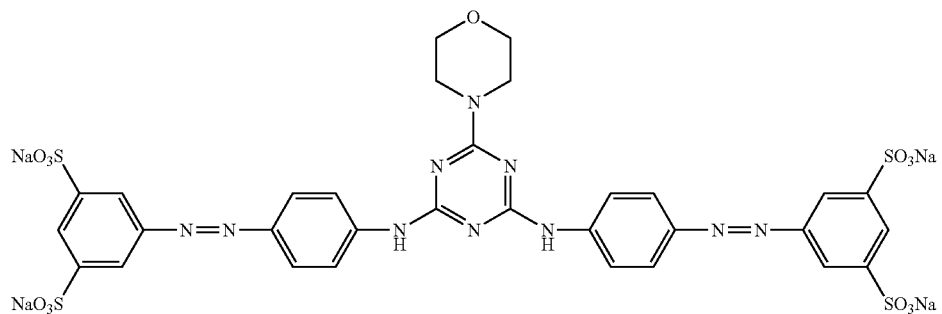

Compound (3)

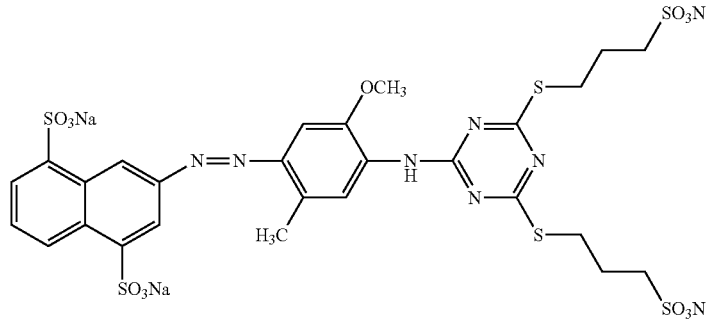

Compound (4)

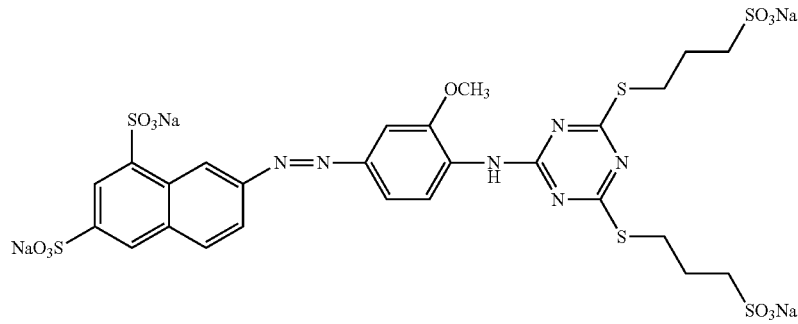

Compound (5)

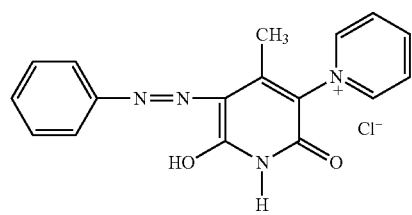

Compound (6)

<Preparation of Comparative Ink 62>

Ultra-pure water (18 MΩ or higher in resistance) was added to the ingredients mentioned below so that the mixture obtained reached a volume of 1 liter, and stirred for 1 hour under heating at a temperature in a range of 30° C. to 40° C. Thereafter, the solution obtained was filtered through a microfilter having an average pore size of 0.25 μm under reduced pressure, thereby preparing an ink solution. To this ink solution, ultra-pure water was added to make the mass of ink obtained 1,000 g. Thus, Ink 62 was prepared.

| | |
|---|---|
| Compound (2-1) | 45 g/l |
| Ethyleneurea | 20 g/l |
| Triethylene glycol | 90 g/l |

-continued

| | |
|---|---|
| Glycerin | 90 g/l |
| Triethylene glycol monobutyl ether | 90 g/l |
| 2-Pyrrolidone | 20 g/l |
| Diethanolamine | 7 g/l |
| Surfynol 465 (manufactured by Nissin Chemical Industry Co., Ltd.) | 10 g/l |
| Proxel XL2 (manufactured by Fujifilm Imaging Colorants Ltd.) | 5 g/l |

<Preparation of Comparative Ink 63 to Comparative Ink 67>

Comparative Ink 63 was prepared in the same manner as Comparative Ink 62 was prepared, except that Compound (2-1) was changed to Compound (2-2), Comparative Ink 64 was prepared in the same manner as Comparative Ink 62 was prepared, except that Compound (2-1) was changed to Compound (3), Comparative Ink 65 was prepared in the same manner as Comparative Ink 62 was prepared, except that Compound (2-1) was changed to Compound (4)

Comparative Ink 66 was prepared in the same manner as Comparative Ink 62 was prepared, except that Compound (2-1) was changed to Compound (5), and Comparative Ink 67 was prepared in the same manner as Comparative Ink 62 was prepared, except that Compound (2-1) was changed to Compound (6).

(Forced-Heating Test)

A 10 mL portion of ink prepared in accordance with each of the formulae shown in Table 1 to Table 3 was put in a sample vial, and stored for 7 days at 60° C. A remaining ratio of compound was determined by carrying out high-performance liquid chromatography (HPLC: LC-20AT made by Shimadzu Corporation), and expressed in % by area in HPLC. The remaining ratio lower than 80% were rated as F, those from 80% to lower than 84% were rated as E, those from 84% to lower than 88% were rated as D, those from 88% to lower than 92% were rated as C, those from 92% to lower than 96% were rated as B and those from 96% to 100% were rated as A, and these ratings are represented as thermal stability in Table 4 to Table 6.

(Testing for Printed Image Evaluation)

The ink prepared according to each of the formulae shown in Table 1 to Table 3 was charged into the cartridge of an inkjet printer PM-G800 made by Seiko Epson Corporation, and by means of this PM-G800 a pattern of yellow monochrome images changing stepwise in density was printed on each of image receiving sheets, including EPSON photo paper <KOTAKU> as paper (a) and EPSON photo paper CRISPIA <KO-KOTAKU> as paper (b), Canon PR101 as paper (c), Hewlett-Pachard Advanced Photo Paper as paper (d) and Fujifilm photo grade inkjet printing paper <KASSAI> as paper (e). On the thus printed images, fastness evaluations were performed.

Evaluations of image storage characteristics were made by measuring color densities in the following manners. As image receiving sheets, the foregoing paper (a) to paper (e) were used.

[1] Lightfastness was evaluated by measuring the density of an image after printing (Ci) by means of X-rite 310, thereafter irradiating the image with xenon light (a hundred thousand lux) for 7 days through the use of a weatherometer made by ATLAS, then again measuring the density of the image (Cf), and determining the dye's remaining ratio (Cf/Ci)×100. As to dye's remaining ratio, evaluations were made on three points where reflection densities were 0.7, 1.2 and 2.0. And cases where the dye's remaining ratio was 85% or higher at every point were rated as A, cases where the dye's remaining ratio was lower than 85% at one point were rated as B, and cases where the dye's remaining ratio was lower than 85% at each of any two points were rated as C, and cases where the dye's remaining ratio was lower than 85% at each of all the three points were rated as D.

[2] Ozone resistance was evaluated by measuring image densities with a reflection densitometer (X-Rite 310TR) before and after 7-day standing in a box adjusted to have an ozone gas concentration of 5 ppm, and determining the dye's remaining ratio. Additionally, the dye's remaining ratio was determined at each of three points where the reflection densities were 0.7, 1.2 and 2.0. The ozone gas concentration in the box was adjusted by means of an ozone gas monitor made by APPLICS Co., Ltd. (Model: OZG-EM-01). The evaluation was made in the light of 4 levels, and more specifically, cases where the dye's remaining ratio was 85% or higher at every density were rated as A, cases where the dye's remaining ratio was lower than 85% at any one density were rated as B, cases where the dye's remaining ratio was lower than 85% at each of any two densities were rated as C and cases where the dye's remaining ratio was lower than 85% at each of all the three densities were rated as D (Discharge Consistency)

Discharge consistency testing was carried out using each ink composition having undergone the thermal stability test. The cartridge was set in the printer, jets of ink were ascertained to issue from all the nozzles, and then output was produced on 20 sheets of A4-size paper and rated on the following criteria. A: From the start to end of printing, there are no irregularities in the prints obtained. B: Output causing irregularities in prints is produced. C: From the start to end of printing, there are irregularities in the prints obtained.

(Chromaticity)

CIE L*a*b* measurements were made on the patterns of yellow monochrome images changing stepwise in density through the use of SpectroEye made by GretagMacbeth. At the reflection density of 1.0, values of a* lower than −6.5 were regarded as being accepted and those of −6.5 or greater are regarded as being rejected, while values of b* greater than 7.0 were regarded as being accepted and those of 7.0 or lower were regarded as being rejected. And cases where both a* and b* values were within the accepted ranges were rated as A, cases where either of the values was within the accepted range were rated as B and cases where both the values were within the rejected ranges were rated as C. The image receiving sheets used were from paper (a) to paper (e).

TABLE 4

| | | | | | Lightfastness | | | | | Ozone Resistance | | | | | Chromaticity | | | | | | |
|---|---|---|---|---|---|---|---|---|---|---|---|---|---|---|---|---|---|---|---|---|---|
| Ink No. | mass % (*1) | Molar ratio | mass % (*2) | Thermal stability | Paper (a) | Paper (b) | Paper (c) | Paper (d) | Paper (e) | Paper (a) | Paper (b) | Paper (c) | Paper (d) | Paper (e) | Paper (a) | Paper (b) | Paper (c) | Paper (d) | Paper (e) | Discharge consistency | note |
| Ink 1 | 5.00 | 9.42 | 14.66 | B | A | A | A | A | A | A | A | A | A | A | A | A | A | A | A | A | Invention |
| Ink 2 | 5.00 | 10.21 | 14.58 | " | " | " | " | " | " | " | " | " | " | " | " | " | " | " | " | " | " |
| Ink 3 | 4.50 | 11.03 | 13.04 | " | " | " | " | B | " | " | " | " | " | " | " | " | " | " | " | " | " |
| Ink 4 | 3.50 | 10.72 | 10.17 | " | " | " | " | A | " | " | B | " | A | " | " | " | " | " | " | " | " |
| Ink 5 | 4.00 | 10.33 | 12.16 | " | " | " | " | " | " | " | A | " | B | " | " | " | " | " | " | " | " |
| Ink 6 | 4.00 | 12.25 | 11.46 | " | " | " | B | B | " | " | B | " | A | " | " | " | " | " | " | " | " |
| Ink 7 | 3.40 | 10.16 | 10.18 | " | " | " | A | A | " | " | A | " | " | " | " | " | " | " | " | " | " |
| Ink 8 | 3.00 | 11.60 | 8.98 | " | " | " | " | " | " | " | " | " | " | " | " | " | " | " | " | " | " |
| Ink 9 | 3.50 | 11.65 | 10.03 | " | " | " | " | " | " | " | B | " | " | " | " | " | " | " | " | " | " |
| Ink 10 | 5.00 | 11.59 | 14.33 | " | " | " | " | " | " | " | A | " | " | " | " | " | " | " | " | " | " |

TABLE 4-continued

|  |  |  |  |  | Lightfastness |  |  |  |  | Ozone Resistance |  |  |  |  | Chromaticity |  |  |  |  |  |  |
|---|---|---|---|---|---|---|---|---|---|---|---|---|---|---|---|---|---|---|---|---|---|
| Ink No. | mass % (*1) | Molar ratio | mass % (*2) | Thermal stability | Paper (a) | Paper (b) | Paper (c) | Paper (d) | Paper (e) | Paper (a) | Paper (b) | Paper (c) | Paper (d) | Paper (e) | Paper (a) | Paper (b) | Paper (c) | Paper (d) | Paper (e) | Discharge consistency | note |
| Ink 11 | 3.10 | 11.86 | 8.14 | " | " | B | " | B | " | " | B | " | B | " | " | " | " | " | " | " | " |
| Ink 12 | 2.10 | 11.67 | 5.51 | " | " | A | " | A | " | " | " | " | A | " | " | " | " | " | " | " | " |
| Ink 13 | 0.60 | 4.96 | 1.60 | A | " | B | " | B | " | B | " | " | B | " | " | " | " | " | " | " | " |
| Ink 14 | 4.00 | 11.77 | 10.39 | B | " | A | " | A | " | A | A | " | A | " | " | " | " | " | " | " | " |
| Ink 15 | 4.00 | 14.86 | 10.81 | C | " | " | " | " | " | " | " | " | " | " | " | " | " | " | " | " | " |
| Ink 16 | 4.00 | 14.86 | 10.55 | " | " | B | " | " | " | " | " | " | " | " | " | " | " | " | " | " | " |
| Ink 17 | 3.50 | 12.93 | 9.23 | B | " | A | " | " | " | " | " | " | " | " | " | " | " | " | " | " | " |
| Ink 18 | 4.00 | 14.86 | 10.55 | C | " | B | " | " | " | " | B | " | " | " | " | " | " | " | " | " | " |
| Ink 19 | 0.00 | 0.00 | 0.00 | A | " | A | " | " | " | " | A | " | " | " | " | " | " | " | " | " | " |
| Ink 20 | 4.00 | 12.25 | 10.15 | B | " | " | " | " | " | " | " | " | B | " | " | " | " | " | " | " | " |
| Ink 21 | 6.00 | 18.38 | 14.49 | C | " | " | " | " | " | " | B | " | A | " | " | " | " | " | " | " | " |
| Ink 22 | 7.00 | 21.44 | 16.51 | D | " | " | " | " | " | " | " | " | " | " | " | " | " | " | " | " | " |

(*1) mass % of moisture-retentive agents having 3 or more hydroxyl groups per molecule with respect to the total amount of ink.
(*2) mass % of moisture-retentive agents having 3 or more hydroxyl groups per molecule with respect to all moisture-retentive agents used.

TABLE 5

|  |  |  |  |  | Lightfastness |  |  |  |  | Ozone Resistance |  |  |  |  | Chromaticity |  |  |  |  |  |  |
|---|---|---|---|---|---|---|---|---|---|---|---|---|---|---|---|---|---|---|---|---|---|
| Ink No. | mass % (*1) | Molar ratio | mass % (*2) | Thermal stability | Paper (a) | Paper (b) | Paper (c) | Paper (d) | Paper (e) | Paper (a) | Paper (b) | Paper (c) | Paper (d) | Paper (e) | Paper (a) | Paper (b) | Paper (c) | Paper (d) | Paper (e) | Discharge consistency | note |
| Ink 23 | 8.00 | 24.50 | 18.43 | D | A | A | A | A | A | A | A | A | A | A | A | A | A | A | A | A | Invention |
| Ink 24 | 9.00 | 27.57 | 20.27 | E | " | " | " | " | " | " | " | B | " | " | " | " | " | " | " | " | " |
| Ink 25 | 10.00 | 30.63 | 22.03 | F | " | " | " | B | " | " | " | A | B | " | " | " | " | " | " | " | Comp. Ex. |
| Ink 26 | 11.00 | 33.69 | 23.71 | " | " | " | B | A | " | " | B | B | " | " | " | " | " | " | " | " | " |
| Ink 27 | 12.00 | 36.76 | 25.32 | " | " | " | A | B | " | " | " | A | A | " | " | " | " | " | " | " | " |
| Ink 28 | 0.00 | 0.00 | 0.00 | A | " | " | " | A | " | " | A | " | B | " | " | " | " | " | " | " | Invention |
| Ink 29 | 4.00 | 11.95 | 10.15 | B | " | " | " | " | " | " | B | " | " | " | " | " | " | " | " | " | " |
| Ink 30 | 6.00 | 17.92 | 14.49 | C | " | " | " | " | " | " | A | B | " | " | " | " | " | " | " | " | " |
| Ink 31 | 7.00 | 20.91 | 16.51 | D | " | " | B | B | " | " | " | A | " | " | " | " | " | " | " | " | " |
| Ink 32 | 8.00 | 23.89 | 18.43 | E | " | " | A | A | " | " | " | " | " | " | " | " | " | " | " | " | " |
| Ink 33 | 9.00 | 26.88 | 20.27 | " | " | " | " | " | " | " | B | " | B | " | " | " | " | " | " | " | " |
| Ink 34 | 10.00 | 29.87 | 22.03 | " | " | " | " | " | " | " | A | " | " | " | " | " | " | " | " | " | " |
| Ink 35 | 11.00 | 32.86 | 23.71 | F | " | B | " | " | " | " | " | B | " | " | " | " | " | " | " | " | Comp. Ex. |
| Ink 36 | 12.00 | 35.84 | 25.32 | " | " | A | " | " | " | " | A | A | " | " | " | " | " | " | " | " | " |
| Ink 37 | 6.60 | 13.40 | 18.18 | C | " | B | " | " | " | " | " | " | " | " | " | " | " | " | " | " | Invention |
| Ink 38 | 6.10 | 16.52 | 16.71 | " | " | B | A | B | " | " | " | B | " | " | " | " | " | " | " | " | " |
| Ink 39 | 5.60 | 17.04 | 16.47 | " | " | A | " | A | " | " | " | B | " | " | " | " | " | " | " | " | " |

TABLE 5-continued

| Ink No. | mass % (*1) | Molar ratio | mass % (*2) | Thermal stability | Lightfastness Paper (a) | Paper (b) | Paper (c) | Paper (d) | Paper (e) | Ozone Resistance Paper (a) | Paper (b) | Paper (c) | Paper (d) | Paper (e) | Chromaticity Paper (a) | Paper (b) | Paper (c) | Paper (d) | Paper (e) | Discharge consistency | note |
|---|---|---|---|---|---|---|---|---|---|---|---|---|---|---|---|---|---|---|---|---|---|
| Ink 40 | 8.00 | 24.50 | 23.26 | D | " | " | " | " | " | " | " | A | A | " | " | " | " | " | " | " | " |
| Ink 41 | 8.00 | 30.94 | 22.60 | F | " | " | B | B | " | " | " | B | " | " | " | " | " | " | " | " | Comp. Ex. |
| Ink 42 | 8.00 | 24.50 | 23.26 | D | " | " | A | A | " | " | " | A | B | " | " | " | " | " | " | " | Invention |
| Ink 43 | 8.00 | 30.94 | 22.60 | F | " | " | B | B | " | " | " | A | " | " | " | " | " | " | " | " | Comp. Ex. |

(*1) mass % of moisture-retentive agents having 3 or more hydroxyl groups per molecule with respect to the total amount of ink.
(*2) mass % of moisture-retentive agents having 3 or more hydroxyl groups per molecule with respect to all moisture-retentive agents used.

TABLE 6

| Ink No. | mass % (*1) | Molar ratio | mass % (*2) | Thermal stability | Lightfastness Paper (a) | Paper (b) | Paper (c) | Paper (d) | Paper (e) | Ozone Resistance Paper (a) | Paper (b) | Paper (c) | Paper (d) | Paper (e) | Chromaticity Paper (a) | Paper (b) | Paper (c) | Paper (d) | Paper (e) | Discharge consistency | note |
|---|---|---|---|---|---|---|---|---|---|---|---|---|---|---|---|---|---|---|---|---|---|
| Ink 44 | 4.00 | 12.25 | 17.02 | B | A | A | A | A | A | A | A | A | A | A | A | A | A | A | A | A | Invention |
| Ink 45 | 4.00 | 12.25 | 17.02 | " | " | " | " | " | " | " | " | " | " | " | " | " | " | " | " | " | " |
| Ink 46 | 8.00 | 24.50 | 23.26 | D | " | " | " | " | " | " | " | " | " | " | " | " | " | " | " | " | " |
| Ink 47 | 8.00 | 24.50 | 23.26 | " | " | " | " | " | " | " | " | " | " | " | " | " | " | " | " | " | " |
| Ink 48 | 2.50 | 8.80 | 7.60 | " | " | " | " | " | " | " | " | " | " | " | " | " | " | " | " | " | " |
| Ink 49 | 2.50 | 8.55 | 7.60 | " | " | " | " | " | " | " | " | " | " | " | " | " | " | " | " | " | " |
| Ink 50 | 3.50 | 11.63 | 10.32 | " | " | " | " | " | " | " | " | " | " | " | " | " | " | " | " | " | " |
| Ink 51 | 5.00 | 17.09 | 14.08 | B | " | " | " | " | " | " | " | " | " | " | " | " | " | " | " | " | " |
| Ink 52 | 5.00 | 17.09 | 14.08 | C | " | " | " | " | " | " | " | " | " | " | " | " | " | " | " | " | " |
| Ink 53 | 8.00 | 28.84 | 23.19 | F | " | " | B | " | " | " | " | B | B | " | B | B | B | B | B | B | Comp. Ex. |
| Ink 54 | 8.00 | 43.30 | 23.26 | " | " | " | A | " | " | " | " | A | A | " | C | C | C | C | C | " | " |
| Ink 55 | 8.00 | 86.52 | 23.32 | " | " | " | " | " | " | " | " | B | " | " | " | " | " | " | " | C | " |
| Ink 56 | 10.50 | 32.16 | 26.52 | " | " | " | B | " | " | " | " | A | " | " | A | A | A | A | A | A | " |
| Ink 57 | 10.50 | 32.16 | 26.25 | " | " | " | " | " | " | " | " | " | " | " | " | " | " | " | " | " | " |
| Ink 58 | 10.50 | 32.16 | 26.25 | " | " | " | A | " | " | " | " | " | " | " | " | " | " | " | " | " | " |
| Ink 59 | 10.50 | 32.16 | 26.25 | " | " | " | " | " | " | " | " | " | " | " | " | " | " | " | " | " | " |
| Ink 60 | 10.50 | 32.16 | 26.25 | " | " | " | " | " | " | " | " | " | " | " | " | " | " | " | " | " | " |
| Ink 61 | 10.50 | 32.16 | 26.25 | " | " | " | " | " | " | " | " | " | " | " | " | " | " | " | " | " | " |
| Ink 62 | 9.00 | — | 28.39 | A | C | C | C | C | C | C | C | C | C | C | C | C | C | C | C | C | " |
| Ink 63 | 9.00 | — | 28.39 | " | " | " | " | " | " | " | " | " | " | " | " | " | " | " | " | " | " |
| Ink 64 | 9.00 | — | 28.39 | " | " | " | " | " | " | " | " | " | " | " | " | " | " | " | " | " | " |
| Ink 65 | 9.00 | — | 28.39 | " | " | " | " | " | " | " | " | " | " | " | B | B | " | " | B | " | " |
| Ink 66 | 9.00 | — | 28.39 | " | " | " | " | " | " | " | " | " | " | " | C | C | " | " | C | " | " |
| Ink 67 | 9.00 | — | 28.39 | " | " | " | " | " | " | " | " | " | " | " | " | " | " | " | " | " | " |

(*1) mass % of moisture-retentive agents having 3 or more hydroxyl groups per molecule with respect to the total amount of ink.
(*2) mass % of moisture-retentive agents having 3 or more hydroxyl groups per molecule with respect to all moisture-retentive agents used.

In the tables, the term "Molar ratio" refers to the molar ratio of the moisture-retentive agents having 3 or more hydroxyl groups per molecule to the compound represented by the formula (1).

In Table 4, Table 5 and Table 6, the expression of "mass % (*1)" refers to the mass % of moisture-retentive agents having 3 or more hydroxyl groups per molecule with respect to the total amount of each ink, and the expression of "mass % (*2) refers to the mass % of moisture-retentive agents having 3 or more hydroxyl groups per molecule with respect to all moisture-retentive agents used.

In Table 6, Ink 53, Ink 54 and Ink 55 were undesirable because of their subdued yellow hue (broadening).

From the results shown in Tables 4 to 6, it is apparent that the present ink compositions are satisfactory in long-term storage stability and the images printed using these ink compositions excel in chromaticity, lightfastness and ozone gas resistance.

Industrial Applicability

The invention can provide ink compositions which have excellent yellow hue and show improvement in decomposition of dyes even when they are stored in high-temperature surroundings. In particular, the invention can provide inkjet recording ink compositions which produce printed images excelling in lightfastness and ozone gas resistance.

While the invention has been illustrated in detail and by reference to the specified embodiments, it is apparent to one skilled in the art that various changes and modifications can be made without departing from the spirit and scope of the invention.

The present invention is based on Japanese Patent Application filed on Jun. 16, 2008 (Japanese Patent Application 2008-157030), and the entire disclosure of this application is incorporated herein by reference.

The invention claimed is:

1. An ink composition comprising:
a compound represented by the following formula (1);
an ingredient (C); and
a moisture-retentive agent,
wherein the content of compound represented by the formula (1) is from 0.1 mass % to lower than 7.0 mass %,
the content of moisture-retentive agent having 3 or more hydroxyl groups is 10.0 mass % or lower,
the molar ratio of the moisture-retentive agent having 3 or more hydroxyl groups to the compound represented by the formula (1) is lower than 30.0:

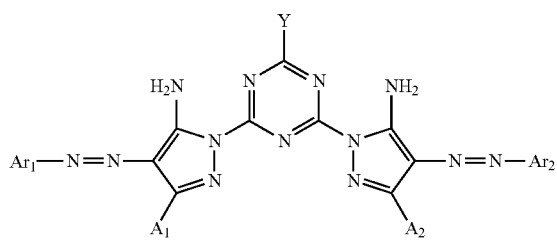

Formula (1)

wherein each of $Ar_1$ and $Ar_2$ independently represents an aromatic cyclic hydrocarbyl group, a nonaromatic cyclic hydrocarbyl group, an aromatic heterocyclic group or a nonaromatic heterocyclic group;

each of $A_1$ and $A_2$ independently represents a hydrogen atom or a substituent which may further have a substituent;

Y represents —OM or —$NR_1R_2$;

M represents a hydrogen atom or a metal ion; and each of $R_1$ and $R_2$ independently represents a hydrogen atom, an alkyl group, an alkenyl group, an alkynyl group, an aralkyl group, an aryl group or a heterocyclic group, wherein the ingredient (C) is at least one compound selected from the group consisting of compounds represented by the following formulae (2), (3), (4), (5) and (6):

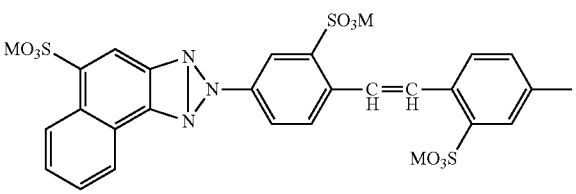

Formula (2)

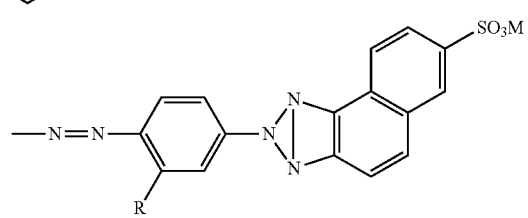

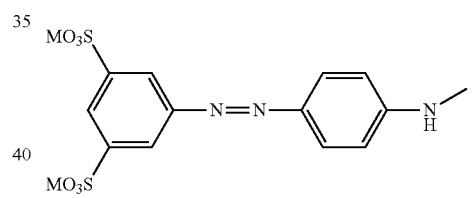

Formula (3)

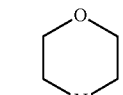

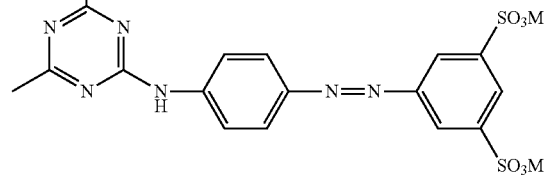

Formula (4)

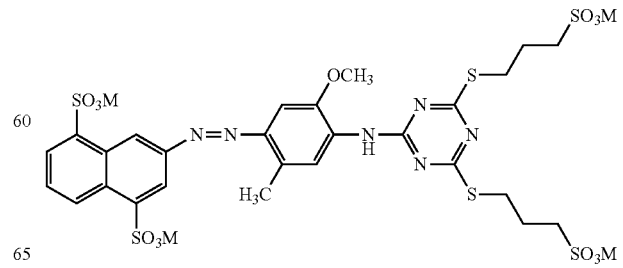

-continued

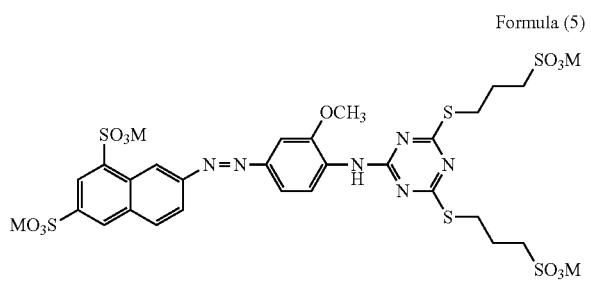
Formula (5)

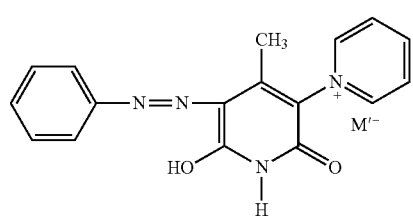
Formula (6)

wherein each M in the formulae (2) to (5) represents a hydrogen atom or a metal ion;
R in the formula (2) represents a hydrogen atom or a methyl group; and
$M'^{-}$ in the formula (6) represents a halogen ion, an inorganic anion or an organic anion.

2. The ink composition according to claim 1, wherein the content of moisture-retentive agent having 3 or more hydroxyl groups is 8.5 mass % or lower.
3. The ink composition according to claim 1, wherein the molar ratio is lower than 25.0.
4. The ink composition according to claim 3, wherein the molar ratio is lower than 15.0.
5. The ink composition according to claim 3, wherein the molar ratio is lower than 10.0.
6. The ink composition according to claim 1, wherein the moisture-retentive agents further include a moisture-retentive agent having 0 to 2 hydroxyl groups.
7. The ink composition according to claim 1, wherein the content of moisture-retentive agent having 3 or more hydroxyl groups is lower than 25.0 mass % of the content of all moisture-retentive agents.
8. The ink composition according to claim 1, wherein the content of moisture-retentive agent having 3 or more hydroxyl groups is lower than 20.0 mass % of the content of all moisture-retentive agents.
9. The ink composition according to claim 1, wherein the content of moisture-retentive agent having 3 or more hydroxyl groups is lower than 15.0 mass % of the content of all moisture-retentive agents.
10. The ink composition according to claim 1, wherein the compound represented by the formula (1) is a compound represented by the following formula (8):

Formula (8)

wherein $A_1, A_2$ and Y have the same meanings as $A_1, A_2$ and Y in the formula (1), respectively;
each of $Y_1$ and $Y_2$ independently represents a hydrogen atom or a substituent;
each of $X_1$ and $X_2$ independently represents an electron-withdrawing group having a Hammett's σp value of 0.20 or greater; and
each of $Z_1$ and $Z_2$ independently represents a hydrogen atom, an alkyl group, an alkenyl group, an alkynyl group, an aralkyl group, an aryl group or a heterocyclic group.

11. The ink composition according to claim 10, wherein the compound represented by the formula (8) is a compound represented by the following formula (9):

Formula (9)

wherein $A_1$, $A_2$, $X_1$, $X_2$, $Y_1$ and $Y_2$ have the same meanings as $A_1$, $A_2$, $X_1$, $X_2$, $Y_1$ and $Y_2$ in the formula (8), respectively;

each of $W_{11}$, $W_{12}$, $W_{13}$, $W_{14}$, $W_{15}$, $W_{21}$, $W_{22}$, $W_{23}$, $W_{24}$ and $W_{25}$ independently represents a hydrogen atom or a substituent; and M represents a hydrogen atom or a metal ion.

12. The ink composition according to claim 1, wherein the compound represented by the formula (1) is a compound represented by the following formula (10):

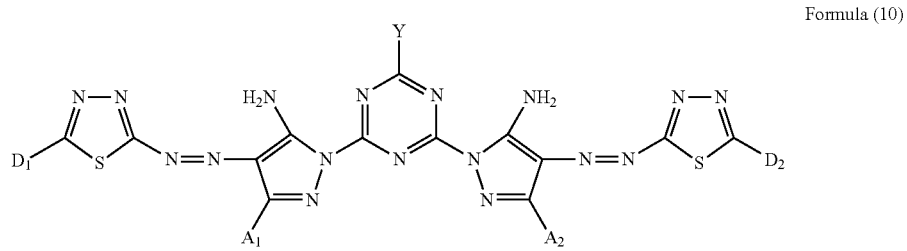

Formula (10)

wherein $A_1$, $A_2$ and Y have the same meanings as $A_1$, $A_2$ and Y in the formula (1), respectively; and each of $D_1$ and $D_2$ independently represents a hydrogen atom or a substituent.

13. The ink composition according to claim 12, wherein the compound represented by the formula (10) is a compound represented by the following formula (11):

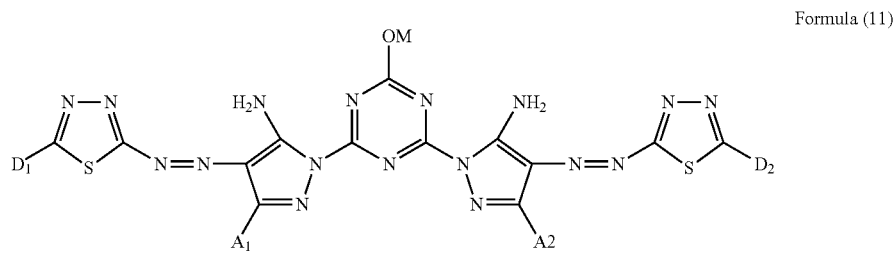

Formula (11)

wherein $A_1$, $A_2$, $D_1$ and $D_2$ have the same meanings as $A_1$, $A_2$, $D_1$ and $D_2$ in the formula (10), respectively; and M represents a hydrogen atom or a metal ion.

14. The ink composition according to claim 1, further comprising a urea derivative.

15. An inkjet recording ink composition utilizing the ink composition according to claim 1.

16. An ink set used for an inkjet recording method, wherein the ink composition according to claim 1 is contained as a constituent.

17. An ink cartridge, wherein the ink composition according to claim 1 is contained.

18. An ink cartridge, wherein the ink set according to claim 16 is independently or integrally accommodated.

19. An inkjet recording method for recording by discharging droplets of an ink composition and allowing the droplets to adhere to a recording medium, wherein the recording is produced through the utilization of the ink set according to claim 16.

20. A recorded matter, which is made through printing according to the inkjet recording method according to claim 19.

* * * * *